US010546335B2

(12) United States Patent
Nagla

(10) Patent No.: US 10,546,335 B2
(45) Date of Patent: Jan. 28, 2020

(54) SYSTEMS AND METHODS FOR PRESENTING VEHICULAR TRANSACTION INFORMATION IN A DATA COMMUNICATION NETWORK

(71) Applicant: ROYAL BANK OF CANADA, Montreal (CA)

(72) Inventor: Gaurav Nagla, Oakville (CA)

(73) Assignee: ROYAL BANK OF CANADA, Montreal (CA)

( * ) Notice: Subject to any disclaimer, the term of this patent is extended or adjusted under 35 U.S.C. 154(b) by 715 days.

(21) Appl. No.: 14/757,723

(22) Filed: Dec. 23, 2015

(65) Prior Publication Data

US 2016/0189260 A1 Jun. 30, 2016

Related U.S. Application Data

(60) Provisional application No. 62/096,755, filed on Dec. 24, 2014.

(51) Int. Cl.
*G06Q 30/00* (2012.01)
*G06Q 30/06* (2012.01)
*G06Q 40/02* (2012.01)

(52) U.S. Cl.
CPC ....... *G06Q 30/0611* (2013.01); *G06Q 40/025* (2013.01)

(58) Field of Classification Search
USPC ........................................ 705/26.1
See application file for complete search history.

(56) References Cited

U.S. PATENT DOCUMENTS

| | | | | |
|---|---|---|---|---|
| 8,204,788 B1* | 6/2012 | Ivankovich | ........ | G06Q 30/0601 705/26.1 |
| 2007/0255649 A1* | 11/2007 | Vagim, III | ............. | B82Y 15/00 705/38 |
| 2014/0229363 A1* | 8/2014 | Orloff | .................. | G06Q 40/025 705/38 |
| 2015/0120489 A1* | 4/2015 | Edelman | ............ | G06Q 30/0611 705/26.4 |
| 2015/0206234 A1* | 7/2015 | Forrester | .............. | G06Q 40/025 705/38 |
| 2016/0180428 A1* | 6/2016 | Cain | .................. | G06Q 30/0623 705/26.61 |

* cited by examiner

*Primary Examiner* — Mila Airapetian
(74) *Attorney, Agent, or Firm* — Norton Rose Fulbright Canada LLP

(57) ABSTRACT

A system for dynamically presenting vehicular transaction information in a data communication network includes a network interface subsystem and a dynamic communication subsystem. The dynamic communication subsystem is configured to: based on offer data parameters and any received response messages, generate data representing an initial list of at least one purchase and financing option; when a first communication trigger condition is detected, generate signals for communicating the data representing the initial list for display on a device associated with a customer; when additional response messages are received, generate update data representing at least one additional or updated purchase and financing option; and generate signals for communicating the update data representing the at least one additional or updated purchase and financing option.

21 Claims, 23 Drawing Sheets

FIG. 12

Purchase Price: $40,000 Down Payment: $0

Dealership Preferred Rates or 4,000 cash bonus

2000

| Options | 24 m | 36 m | 48 m | 60 m | 72 m | |
|---|---|---|---|---|---|---|
| Dealership Financing | 2.90% | 2.90% | 1.90% | 1.90% | 0.90% | Rate |
| | $1,717 | $1,161 | $866 | $699 | $570 | Mon Pymt |
| | $41,219 | $41,813 | $41,570 | $41,961 | $41,104 | Total Cost |

Combined Price: $36,000

Down Payment: $0

| Options | 24 m | | 36 m | | 48 m | | 60 m | | 72 m | |
|---|---|---|---|---|---|---|---|---|---|---|
| | 5.99% | Rate | 6.99% | Rate | 5.99% | Rate | 3.99% | Rate | 4.99% | Rate |
| Bank Auto Financing | $1,595 | Mon Pymt | $1,111 | Mon Pymt | $845 | Mon Pymt | $662 | Mon Pymt | 579 | Mon Pymt |
| | $38,289 | Total Cost | $40,010 | Total Cost | $40,574 | Total Cost | $39,769 | Total Cost | $41,731 | Total Cost |
| | 5.68% | Rate | 5.68% | Rate | 5.68% | Rate | 5.68% | Rate | 5.68% | Rate |
| Line of Credit | $1,590 | Mon Pymt | $1,089 | Mon Pymt | $840 | Mon Pymt | $690 | Mon Pymt | $591 | Mon Pymt |
| | $38,168 | Total Cost | $39,239 | Total Cost | $40,329 | Total Cost | $41,438 | Total Cost | $42,566 | Total Cost |
| | 4% | Rate | 4% | Rate | 4% | Rate | 4% | Rate | 4% | Rate |
| Home Line | $1,563 | Mon Pymt | $1,062 | Mon Pymt | $812 | Mon Pymt | $662 | Mon Pymt | $563 | Mon Pymt |
| | $37,519 | Total Cost | $38,263 | Total Cost | $39,016 | Total Cost | $39,779 | Total Cost | $40,552 | Total Cost |

FIG. 21

Dealership Purchase Price: $40,000

Others' Purchase Prices $36,000

| Options | 24 m | | 36 m | | 48 m | | 60 m | | 72 m | |
|---|---|---|---|---|---|---|---|---|---|---|
| Dealership Financing | 2.90% | Rate | 2.90% | Rate | 1.90% | Rate | 1.90% | Rate | 0.90% | Rate |
| | $1,717 | Mon Pymt | $1,161 | Mon Pymt | $866 | Mon Pymt | $699 | Mon Pymt | $570 | Mon Pymt |
| | $41,219 | Total Cost | $41,813 | Total Cost | $41,570 | Total Cost | $41,961 | Total Cost | $41,104 | Total Cost |
| Bank Auto Financing | 5.99% | Rate | 6.99% | Rate | 5.99% | Rate | 3.99% | Rate | 4.99% | Rate |
| | $1,595 | Mon Pymt | $1,111 | Mon Pymt | $845 | Mon Pymt | $662 | Mon Pymt | 579 | Mon Pymt |
| | $38,289 | Total Cost | $40,010 | Total Cost | $40,574 | Total Cost | $39,769 | Total Cost | $41,731 | Total Cost |
| Line of Credit | 5.68% | Rate | 5.68% | Rate | 5.68% | Rate | 5.68% | Rate | 5.68% | Rate |
| | $1,590 | Mon Pymt | $1,089 | Mon Pymt | $840 | Mon Pymt | $690 | Mon Pymt | $591 | Mon Pymt |
| | $38,168 | Total Cost | $39,239 | Total Cost | $40,329 | Total Cost | $41,438 | Total Cost | $42,566 | Total Cost |
| Home Line | 4% | Rate | 4% | Rate | 4% | Rate | 4% | Rate | 4% | Rate |
| | $1,563 | Mon Pymt | $1,062 | Mon Pymt | $812 | Mon Pymt | $662 | Mon Pymt | $563 | Mon Pymt |
| | $37,519 | Total Cost | $38,263 | Total Cost | $39,016 | Total Cost | $39,779 | Total Cost | $40,552 | Total Cost |

SYSTEMS AND METHODS FOR PRESENTING VEHICULAR TRANSACTION INFORMATION IN A DATA COMMUNICATION NETWORK

CROSS-REFERENCE TO RELATED APPLICATIONS

This application claims the benefit, including priority, of U.S. Provisional Patent Application No. 62/096,755, filed Dec. 24, 2014, and entitled "SYSTEMS AND METHODS FOR FACILITATING AUTOMOTIVE TRANSACTIONS," the entirety of which is hereby incorporated by reference.

FIELD

Aspects of the present disclosure relate to handling data communications, and in specific embodiments to dynamic presentation of vehicle transaction information in a data communication network.

INTRODUCTION

Online car listings or in-person dealership visits can provide information regarding vehicles on sale or lease. However, these sources provide limited, single-source and static information, and parties to a transaction may be negotiating without being able to consider one or more options available to them.

SUMMARY

In accordance with one aspect, there is provided a system for dynamically presenting vehicular transaction information in a data communication network. The system includes a network interface subsystem and a dynamic communication subsystem. The network interface subsystem is configured to: receive, from at least one network system, at least one offer communication message including offer data defining parameters for one or more vehicle offers; transmit at least one financing request message to the at least one network system, the at least one financing request message including at least one of the parameters for the one or more vehicle offers; transmit at least one credit request to the at least one network system, the at least one credit request including at least one identified associated with a customer; and receive response messages to the at least one financing request and the at least one credit request. The a dynamic communication subsystem is configured to: based on the offer data parameters and any received response messages, generate data representing an initial list of at least one purchase and financing option; when a first communication trigger condition is detected, generate signals for communicating the data representing the initial list for display on a device associated with the customer; when additional response messages are received, generate update data representing at least one additional or updated purchase and financing option; and generate signals for communicating the update data representing the at least one additional or updated purchase and financing option.

In accordance with another aspect, there is provided a method for dynamically presenting vehicular transaction information in a data communication network. The method includes: receiving, from at least one network system, at least one offer communication message including offer data defining parameters for one or more vehicle offers; transmitting at least one financing request message to the at least one network system, the at least one financing request message including at least one of the parameters for the one or more vehicle offers; transmitting at least one credit request to the at least one network system, the at least one credit request including at least one identified associated with a customer; based on the offer data parameters and any received response messages to the at least one financing request and the at least one credit request, generating data representing an initial list of at least one purchase and financing option; when a first communication trigger condition is detected, generating signals for communicating the data representing the initial list for display on a device associated with the customer; when additional response messages are received, generating update data representing at least one additional or updated purchase and financing option; and generating signals for communicating the update data representing the at least one additional or updated purchase and financing option.

In accordance with another aspect, there is provided a method of for dynamically presenting vehicular transaction information from a data communication network. The method includes: receiving, via a user interface, a first data set including initial parameters for a vehicle search; transmitting, to a remote server, at least one request message including at least one of: a financing request message and a credit request message, and the at least one request message including data based on at least one initial parameter for the vehicle search; displaying, via the user interface, additional options for the vehicle search and receiving additional parameters for the vehicle search; based on the initial parameters, the additional parameters and any received response messages to the at least one request message, displaying an initial list of at least one purchase and financing option; and when additional response messages or further additional parameters are received, displaying an updated list of at least one purchase and financing option.

In accordance with another aspect, there is provided a non-transitory, computer-readable medium or media having stored thereon computer-interpretable instructions. When executed by at least one processor, the computer-interpretable instructions configure the at least one processor for: receiving, from at least one network system, at least one offer communication message including offer data defining parameters for one or more vehicle offers; transmitting at least one financing request message to the at least one network system, the at least one financing request message including at least one of the parameters for the one or more vehicle offers; transmitting at least one credit request to the at least one network system, the at least one credit request including at least one identified associated with a customer; based on the offer data parameters and any received response messages to the at least one financing request and the at least one credit request, generating data representing an initial list of at least one purchase and financing option; when a first communication trigger condition is detected, generating signals for communicating the data representing the initial list for display on a device associated with the customer; when additional response messages are received, generating update data representing at least one additional or updated purchase and financing option; and generating signals for communicating the update data representing the at least one additional or updated purchase and financing option.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein:

FIGS. 6-17 are several screenshots from a mobile application, depicting various stages of a new vehicle purchase process flow.

FIGS. 20-22 show example data sets.

DETAILED DESCRIPTION

Transactions for the purchase/sale of a vehicle may involve various parties, such as buyers, sellers, dealerships, credit rating bureaus and/or financial institutions. The transactions may involve new vehicles, used vehicles, and/or vehicles for trade-in.

Buyers and sellers may have varying levels of sophistication, for example, one party (the buyer or the seller) may be a dealership (which may likely have a greater level of sophistication) and the counterparty may be an individual (whose knowledge of information related to automotive finance may not be complete and/or current). Accordingly, there may be a level of information asymmetry between the parties to a transaction. Further, one party may not have any indication of whether the other party is creditworthy.

There may be a need for a party to a transaction (whether the party is a buyer, a seller, etc.) to view and obtain information related to the transaction such that the party is able to make an informed decision.

In some instances, information may be found at many disparate data sources, and may be dependent on data from a multiple sources. Accordingly, in some situations, the ability to coordinate, schedule or otherwise manage data for presentation in a timely and relevant manner depending on factors such as network conditions, data availability, etc. may be beneficial.

Figure 1A:
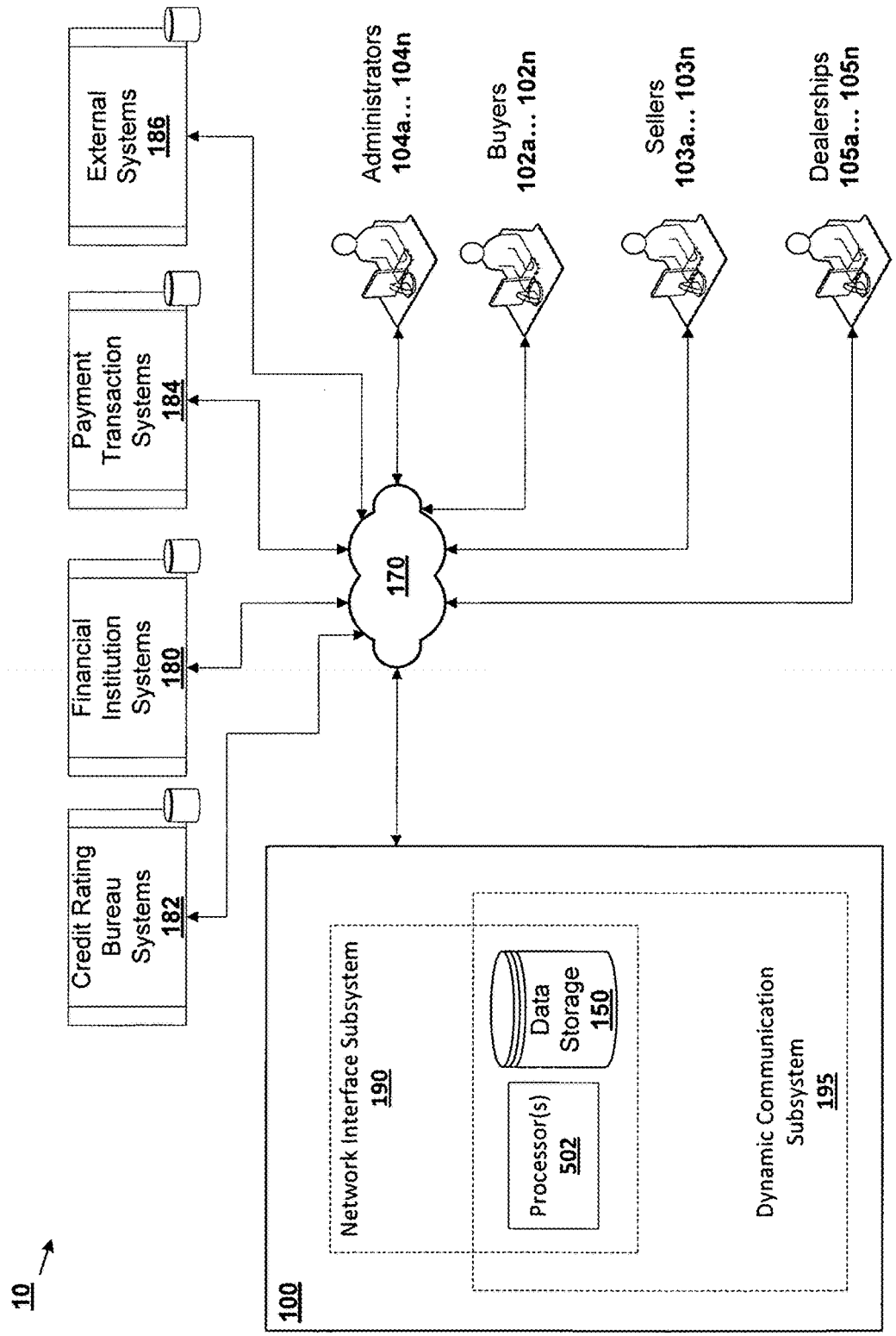
FIGS. 1A and 1B are block schematic diagrams showing aspects of example data communication networks.

FIG. 1A is a block schematic diagram showing aspects of an example data communication network 10 to which embodiments of the present disclosure may apply.

The data communication network 10 is a system and/or arrangement of network systems. The data communication network 10 can include a system 100 configured to managing communications between different network systems in the data communication network 10. In some embodiments, the system 100 can be configured for dynamically presenting vehicular transaction information. In some embodiments, the system 100 can be configured for facilitating transactions involving one or more vehicles over a network, according to some embodiments.

The system 100 may be configured for interaction with one or more devices/systems 102a . . . 102n (collectively 102) associated with one or more buyers, one or more devices/systems 103a . . . 103n (collectively 103) associated with one or more sellers, one or more devices/systems 104a . . . 104n (collectively 104) associated with one or more administrators, and/or one or more devices/systems 105a . . . 105n (collectively 105) associated with one or more dealerships.

In this disclosure, the term system should be understood as referring to a single device or multiple devices. These devices may be physically, logically or functionally connected. Similarly, the term device is not limited to a single device, but in some embodiments, may include multiple devices/systems which may be physically, logically or functionally connected.

The devices associated with the buyers 102, sellers 103, administrators 104 and dealerships 105 may be any network device or system which can be communicably connected to the system 100. In some examples, the devices 102, 103, 104, 105 may be computers, servers, mobile devices, and the like. In some embodiments, the devices 102, 103, 104, 105 may be associated with buyers, sellers, administrators, dealerships, based on their network addresses, MAC addresses or other identifiers, tokens or other identifying information. In some examples, the devices 102, 103, 104, 105 may be associated to a buyer, seller, administrator, dealership based on authentication data communicated over a session between the device 102, 103, 104, 105 and the system 100. In some examples, sessions can be created via a web server, application or other software running on the device 102, 103, 104, 105, as a remote terminal, or any other suitable mechanism.

The buyers and sellers may include entities that may be able to engage in transactions, such as members of the public, individuals, corporations, partnerships, etc.

Buyers may include entities seeking to buy a vehicle. In some embodiments, buyers may also be seeking to trade-in their existing vehicle. For example, a buyer may be a student looking to buy a car for college, a contractor looking to buy a pick-up truck and to trade-in an existing SUV, etc. Sellers may include entities seeking to sell a vehicle. For example, a businessperson may be moving to another country and seeking to sell his/her car before leaving. Administrators may include individuals who may interact with the system 100 for various purposes, such as configuration of options, modification of rules, graphical user interface (GUI) modifications, etc.

The groupings of buyers, sellers, administrators and dealerships may not be mutually exclusive. For example, in various transactions, a buyer may be a seller, a seller may be a buyer, an administrator may be a buyer/seller, etc. Individuals using the system 100 may generally be described as users.

Dealerships may include entities that may operate various businesses that engage in financial transactions including vehicles. These entities may be virtual or physical, and may be associated with various vehicle manufacturers. For example, dealerships may include various Honda™ dealerships, Ford™ dealerships, family-run dealerships associated with multiple manufacturers, used car dealerships, etc.

In some embodiments, the devices 102, 103, 104, 105 can be configured to communicate with the system 100 to exchange messages and requests relating to authentication/ identifying/credential information, data defining parameters for vehicle offers, financing data, credit data, purchase and financing option data, signals for displaying data, signals for updating data, trigger signals and the like.

The system 100 may be comprised of various subsystems, which may include, for example, a network interface subsystem 190, a dynamic communication subsystem 195, and any other physical or logical subsystems. In some examples the subsystems may embody various functions to be performed by processors but may otherwise have no physical or logical distinction.

The subsystems can include one or more processors 502 on one or more devices in the system 100 configured to perform the functions of the respective subsystems. In some embodiments, the subsystems can share one or more the processors and/or devices. In some embodiments, the subsystems can include one or more other subsystems or portions of one or more other subsystems. The subsystems can include one or more data storage devices 150.

The network interface subsystem 190 includes one or more processors configured to communicate with one or more network systems such as systems associated with credit rating bureaus 182, systems associated with financial institutions 180, payment transaction systems 184, dealership systems 105, administrator systems 104, buyer systems 102, seller systems 103 and/or other external systems 186.

In some embodiments, the network interface subsystem 190 receives from at least one network system (such as a dealership system 105, or seller system 103) one or more offer communication messages. The offer communication messages can include data defining parameters for one or more vehicle offers. For example, parameters can include data defining vehicle makes, models, classes, add-on packages, vehicle specifications, trims, mileage, photos, colours, years, purchase prices, lease prices, dealer incentives, manufacturer incentives, offer expiry times/dates, vehicle identification numbers (VIN) and/or any other information for specifying a vehicle, and the parameters for purchasing/leasing the vehicle being offers from the dealership/seller system.

In some examples, processor(s) 502 can be configured to store received offer data in the data storage device(s) 150. In some examples, the processor(s) 502 may store the offer data in association with a particular buyer profile. In some embodiments, the processor(s) 502 may store the offer data for determining average or typical offers for vehicles/customers having one or more parameters.

The network interface subsystem 190 can transmit one or more financing requests to one or more network systems (such as a financial institution system) for data defining one or more financing options for a potential buyer. In some examples, financing requests can include identifiers or credentials for one or more parties in a possible vehicle transaction (e.g. a buyer or a seller/dealership). For example, a financing request can include a unique or a collection of unique information for identifying and/or authenticating a buyer for whom the financing request is being made. This information may include a unique identifier or username, names, addresses, birthdates, social security number, social insurance number, credit card numbers, driver's license information, passport number, birth certificate information, employer information, biometric data, unique tokens and the like. In some examples, the buyer information may be used to verify the identity of the buyer and/or to help determine the credit worthiness of the buyer.

In some examples, the system 100 may be linked to or trusted by the financial institution or other network system such that if the system 100 has already verified the identity of the buyer associated with the buyer device, additional buyer information may not be required to be sent with the financing request message.

In some embodiments, the financing request messages can include vehicle information, prices, lease information, terms, dealer/seller information and the like. In some embodiments, the financing request messages may only require a financing amount and/or a vehicle book value for which the financing request is being requested.

The network interface subsystem 190 can receive one or more response messages to the financing requests from the financial institution system or other network system. In some examples, the response messages can include data defining parameters for one or more financing options available from the financial institution or other third party not directly involved (i.e. as a purchaser or seller) in the vehicle transaction.

For example, the parameters can include maximum loan size, interest rates, loan terms, variable or fixed term information, periodic payment periods, periodic payment amounts, amortization periods, secured or unsecured information, credit scores, risk scores, asset information, income information, debt information, and the like. In some examples, the one or more financing options available from the financial institution may be different than options which may be offered by a dealership. For example, a financial institution may have or may provide data which may allow the system 100 to identify and/or determine different rates, unsecured or secured options, ability to open or draw on business accounts, mortgages, home equity lines of credit, etc.

The network interface subsystem 190 can receive one or more response messages to the credit requests from the credit rating system or other network systems. In some examples, the response messages can include data for determining a credit risk associated with a customer. For example, the data can include credit scores, credit ratings, credit account information, credit inquiry history data, credit account limits, credit account balances, payment histories, credit report information, and/or any other information which may be stored at a credit bureau system.

In some embodiments, the network interface subsystem 190 can also be involved in handling communications between the system 100 and devices/systems 102, 103, 104, 105, etc.

The dynamic communication subsystem 195 includes one or more processors configured to manager and dynamically update data for communication with external devices/systems 102, 103, 104, 105, etc.

The processor(s) generate data representing one or more purchase/financing options for presenting at a buyer system 102. In some examples, the purchase/financing options are based at least in part of offer data received from dealership systems 105 and/or seller systems 103.

As additional data such as response messages from other systems 180, 182, etc. are received, the processor(s) can update or generate additional purchase/financing options.

For example, the processor(s) may generate data representing purchasing/financing options based on initially available information such as dealer offers which may include for example, purchase or lease options. The generation of this data may include generating total costs including prices, rebates, taxes, additional fees, etc. In some examples, such as lease offers, the generation of this data may include generating periodic payment amounts, interest rates, total costs, buyout prices, etc.

In some examples, the initially available information may additionally or alternatively include financing response data. In some examples, the initially available information may additionally or alternatively include credit data.

The processor(s) may generate a list of the purchase and financing options including one or more parameters defining those options. As additional data is received, the processor(s) can add or update options and/or generate a new list.

The processor(s) can be configured to detect one or more first communication triggers, and upon detection one or more of these triggers, the processor(s) generate signals for communicating the data representing an initial list of the purchase and financing options for display on a device/system associated with the customer (e.g. buyer or seller).

In some examples, the data may represent a visual representation for display on a user interface. In some examples, the data may only include data fields which may be used by a customer system to generate a visual representation of the initial list.

In some embodiments, one or more offers in the initial list may be presented as conditional until additional credit/user/financing information is available.

In some embodiments, the trigger condition can be triggered when the system 100 receives signals indicating that the transmission of a financing request and/or a credit request were unsuccessful. For example, these signals could include a message from a network device (e.g. a router or switch in network 170) or network system 180, 182, 186 indicating that an IP or other address associated with the network system is unreachable, a message from the network system indicating that the network system is down or unavailable, a message from the network system indicating that the financing/credit request may be delayed, or any other message from a network system or intermediary device/system indicating that the financing request and/or credit request may not be responded to at a particular time or ever.

The trigger condition can provide an initial set of offer(s) to be presented on a display at a customer device while additional information is not currently available. In some instances, this may allow for initial purchase and financing options to be displayed for a user such that the user does not lose interest or wonder if the system is operating properly. In some instances, it may allow for purchase and financing options to be presented at a device/system even if some network systems are having network, system, or data problems.

In some embodiments, the trigger condition can be triggered when the system 100 receives signals indicating that inputs are received at a customer device (102, 103) for navigating to a different view or portion of a user interface. For example, when an input is received to scroll down in a webpage or application user interface or move to a different screen on which financing options are to be displayed, the customer device may send signals to the system 100 to trigger the generation and/or communication of data representing the initial list.

In some examples, when an input is received to navigate or move to a different view which precedes a financing option view, the customer device may send the signals to trigger the trigger condition. In some examples, this may allow for the processing and communication of purchase and financing information before it is needed to be displayed. In some examples, this may reduce the chance that a user interface including financing options is displayed without any purchase or financing data.

In some embodiments, the trigger condition can be triggered when a defined time period has elapsed. In some examples, this time period may be defined by a typical/average/median/etc. time in which data from network systems is usually received by the system 100. In some embodiments, the time period may be statically or dynamically defined.

After a trigger condition and communication of data representing an initial list, when additional response messages (e.g. credit request response and/or financing request response) are received, the processors can generate update data representing an additional or updated purchase and financing option.

The processor(s) can generate signals for communicating the update data to the customer system 102, 103. In some examples, communicating the update data can include data only representing changes to the initial list or data previously-provided to the customer system. In some examples, communicating the update data can include data for the entire list of purchase and financing options.

In some embodiments, when the processor(s) receive signals indicating that the update data was not successfully display, the processor(s) can transmit a message including the update data to a customer device/account via another mechanisms such as to a messaging address (e.g. email address, SMS message, message associated with the customer profile, etc.). In some examples, the signals may include signals indicating that the device associated with the customer is no longer on a user interface view including the financing options, or is no longer viewing the auto financing webpage/application.

In some examples, this may provide a backup or additional electronic message to a system/device/account associated with a customer. In some examples, this detection and dynamic messaging may reduce the chance that the customer may be relying upon incorrect or out of date information.

In some examples, the processor(s) may receive offer expiration messages which include data indicating that one or more offers are no longer available or have changed. Upon receipt, the processors generate update data to remove or update the purchase or financing options from the list displayed at the customer system.

Figure 1B:
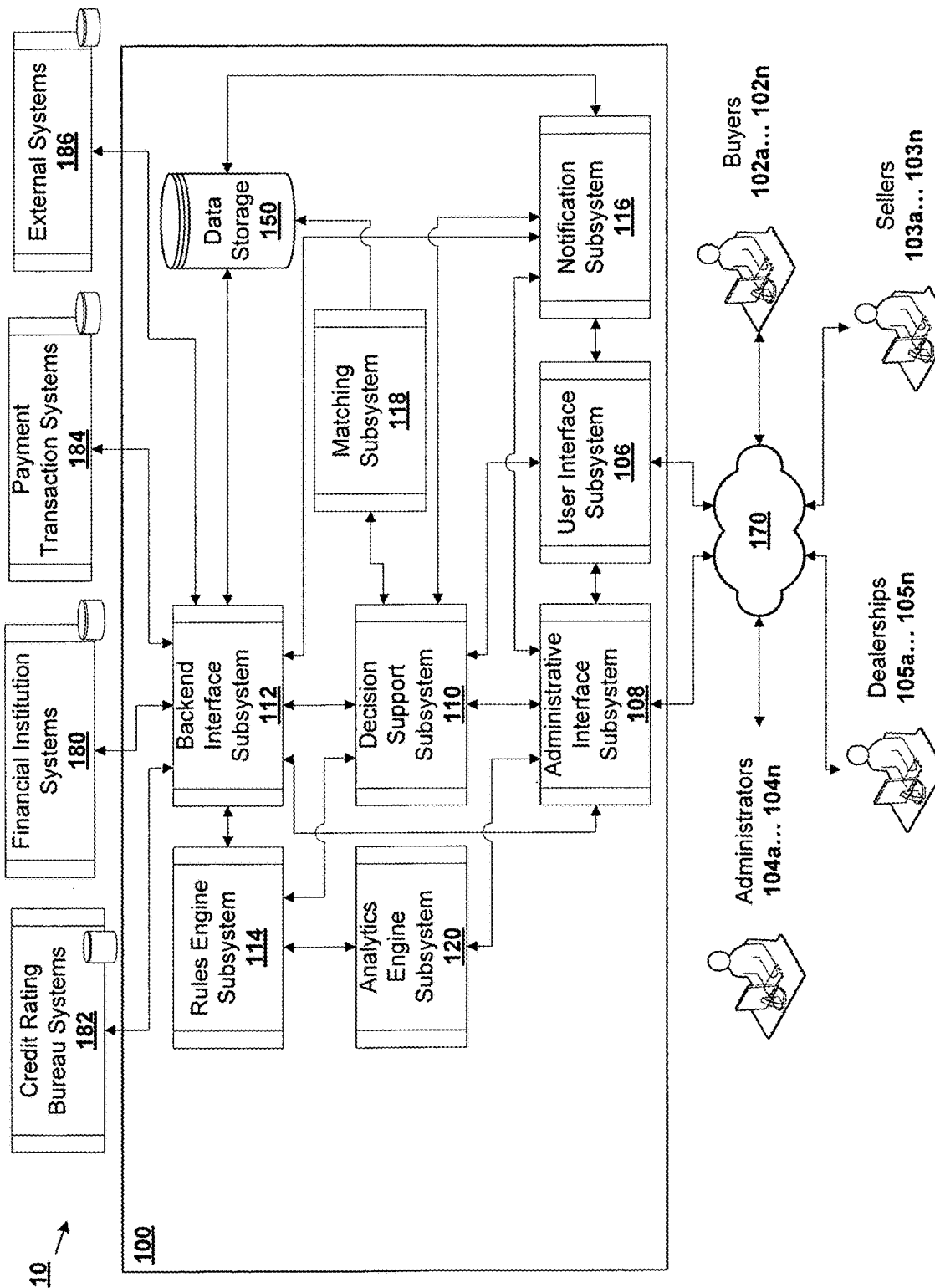

FIG. 1B shows another block schematic diagram showing aspects of an example data communication network 10 to which embodiments of the present disclosure may apply. The network interface subsystem 190 and/or the dynamic communication subsystem 195 can interact with, include or be a portion of a user interface subsystem 106, an administrative interface subsystem 108, a decision support subsystem 110, a backend interface subsystem 112, a rules engine subsystem 114, a notification subsystem 116, a matching subsystem 118, an analytics engine subsystem 120, and/or a data storage 150.

The system 100 may be configured to communicate with external systems 186 and/or devices associated with users (e.g., buyers, sellers, administrators, dealerships), through one or more networks 170.

The system 100 may be implemented on one or more computing devices, the computing devices including one or more processors, non-transitory computer readable memories, instruction sets, etc. For example, the computing devices could include computer systems, smart phones, distributed networking devices (e.g., cloud-computing), virtual devices, etc.

The networks 170 may include various networks, such as intranets, the Internet, point-to-point communication networks, dedicated connections, private and/or public networks, etc., and/or any combination thereof and may be implemented using a variety of networking technologies.

The data storage devices 150 may include relational databases, flat databases, Microsoft Excel™ tables, and any other suitable format and/or container for storing data. For example, the data storage 150 may be implemented using various technologies, such as virtual devices, non-transitory computer readable media, etc. In some embodiments, the data storage 150 may be configured for compression, extraction, transformation and/or loading of data.

The data storage 150 may contain various types of information, such as historical information, user preferences, user profiles, dealer bids/quotes, vehicle listings, vehicle photographs, information obtained from external systems and/or databases, saved user progress through various process workflows, calculated metrics, etc.

The user interface subsystem 106 may be configured for interaction with the users (e.g., buyers, sellers, administrators, dealerships). The user interface subsystem 106 may provide various interfaces that facilitate users in interactions with the system 100, such as a website, a mobile-enabled website, applications for smart devices (e.g., tablets, smart phones, e-book readers), application programming interfaces (APIs), etc.

The user interface subsystem 106 may include one or more graphical user interfaces which may be utilized by the system 100 to display information and/or receive inputs relevant to transactions involving vehicles. For example, an application may be provided including a series of screens having a defined workflow and/or process flow for a user to sequentially engage in through the course of a transaction. A process flow may be suitably designed and/or configured such that a user may be able to start with an inquiry and end with either a vehicle transaction completed or reserved. In some embodiments, the GUIs are configured to present information in a cohesive and easy to comprehend arrangement.

The user interface subsystem 106 may be configured such that a user is able to track and/or save the user's progress through one or more process/workflows. For example, a user may be able to return to a historical inquiry, receive decision support and/or engage in a transaction over a period of time.

The user interface subsystem 106 may, in some embodiments, be configured to maintain one or more user profiles. For example, a user may be able to provide various elements of information regarding the user, such as name, phone number, email address, personal address, preferred communication option, etc. The user interface subsystem 106 may be able to derive various elements of information from information stored on a user's computing device.

The user interface subsystem 106 may be configured to display elements of information relevant to a transaction, such as financing options, trade-in options, purchase/selling options, reviews, approvals, pre-approvals, pre-qualifications, etc. The user interface subsystem 106 may also be configured to indicate the timeframe in which offers may be valid.

In some embodiments, the user interface subsystem 106 may be configured to display various advertisements to a user, and in some further embodiments, the advertisements may be targeted based on one or more rules defined and/or applied by the rules engine subsystem 114. For example, if a user is looking to buy a pick-up truck, advertisements may be geared towards demographics who tend to buy pick-up trucks.

In some embodiments, the user interface subsystem 106 may be configured to receive various information regarding a vehicle to be sold, such as photographs of the vehicle, mileage, maintenance records, collision records, vehicle condition, etc.

The user interface subsystem 106 may be configured to arrange information such that individuals having a lower level of financial literacy may be able to easily consume and understand information that may be relevant to making a financial decision. For example, the user interface subsystem 106 may interoperate with the decision support subsystem 110 in deriving one or more metrics that may provide, for example, a stronger understanding to an individual the impacts of various financing options.

The administrative interface subsystem 108 may be configured to support various administrative activities, such as the conducting of analysis, the modification of GUI arrangements, the modification of process flows, etc. The administrators may be able to view various reports and/or tracked user data, such as the aggregate number of transactions completed, number of vehicles reserved, number of transactions not complete, number of inquiries, number of users selecting manufacturer financing as compared to bank financing, etc.

The decision support subsystem 110 may be configured to determine, calculate, generate and/or display options that may be presented to a user in relation to a potential transaction. For example, a user may provide an inquiry through the user interface subsystem 106, and the decision support subsystem 110 may be configured to respond to the inquiry with various options.

In some embodiments, the decision support subsystem 110 may be configured to obtain options based on variations of various parameters of a customer's inquiry. For example, if a user is seeking to purchase a Honda Accord™, the decision support subsystem 110 may be configured to search more broadly in the class of mid-sized sedans.

The decision support subsystem 110 may be configured to interoperate with a backend interface subsystem 112 to receive relevant information, such as incentives available, offers available, financing options (e.g., rates, terms, security requirements) available, pricing information available, etc.

The decision support subsystem 110 may be configured such that information received from various sources may be transformed, analyzed, collated, etc., prior to presentation to a user. For example, the decision support subsystem 110 may receive various offers and financing options, and may group and/or otherwise transform offerings such that a cohesive offering may be presented to a user.

The decision support subsystem 110 may advantageously provide for the automatic or semi-automatic calculating of options and/or the determining of which ones should be preferred through the determination of various metrics (e.g., the determination of a total cost of ownership, the determination of an estimated monthly installment, the estimation of the total time to pay off, amortized value, the effect of depreciation, residual values).

The decision support subsystem 110 may be configured to prioritize and/or rank various options and/or offerings, for example, providing only a select number of most favorable options to the user.

The decision support subsystem 110 may be configured to provide comparisons with other transactions, such as transactions for similar vehicles (e.g., vehicles in the same class, same price bracket, vehicles having different trim options, manual/automatic transmission vehicles, hybrid/non-hybrid vehicles), historical transactions (e.g., this sedan has been sold at a higher price on average), aggregate market information (e.g., the Canadian Black Book has this vehicle listed at $23,000), comparisons between dealerships (e.g., dealer A is selling the vehicle for $23,000, and dealer B is selling the vehicle for $22,000), etc.

The determination and ranking of options is a non-trivial exercise, as there are many parameters that all change over time, and updating the information is time consuming. The decision support subsystem 110 may be configured to compare and rank different types of financing options and/or purchasing options based on the total cost of ownership over a period of time. For example, a user may be comparing between buying a vehicle outright, buying a vehicle outright and financing the purchase using a loan from a bank, leasing a vehicle, and/or buying the car using financing from a manufacturer.

The decision support subsystem 110 may be configured to display bids without providing information, such as dealership names (e.g., only identifying dealers as Dealer A, Dealer B). The decision support subsystem 110 may be configured to only request bids from dealers within a particular geographical distance from the user. In some embodiments, the decision support system only provides details of a dealership after a transaction has been made and/or a vehicle has been reserved.

The decision support subsystem 110 may be further able to access various financial products that may not be readily available to a user using conventional systems, such as various expanded financing options (e.g., not only manufacturing financing, but also bank financing), products related to existing products held at financial institutions, etc. These options may be provided and/or analyzed by the decision support subsystem 110.

The decision support subsystem 110 may be configured for interoperation, through the backend interface subsystem 112, with various credit rating agencies and/or bureaus to determine the creditworthiness of a particular user.

The backend interface subsystem 112 may be configured for communication with various external systems, such as credit rating bureau systems 182, financial institution systems 180, payment transaction systems 184, other external systems 186 (e.g., manufacturer systems, incentive databases, government subsidy systems).

For example, the payment transaction systems 184 may be accessed to conduct various elements of a transaction, such as processing a payment to hold a reservation, processing a payment to pay for a vehicle, etc. The credit rating bureau systems 182 may be accessed provide credit information, such as credit reports, credit scores, indications of credit worthiness, etc.

The backend interface subsystem 112 may be configured to integrate with one or more financial institutions. Accordingly, the capability of the system 100 to be able to integrate with financial institution systems 180 and credit rating bureau systems 182 may provide various incentives (e.g., pre-qualifications) that may motivate the dealerships to offer a better price than otherwise available. Further, the dealerships may be tied to the platform in a way that they are obligated to honour their bids.

The backend interface subsystem 112 may be able to access other financial products that the consumer may have already accessed, and so the relationships between these and possible financing options can be mapped automatically.

The backend interface subsystem 112 may be configured for cross-promotion through its integration with financial institution systems 180, such as the ability to cross-sell linked products, the ability to cross-promote, the ability to conduct cross-platform marketing analyses, the ability to more seamlessly integrate services (e.g., due to pre-qualifications, information already captured saved on/accessible from various databases).

The communication may be through one or more networks, and also may be through various point-to-point networking technologies. The backend interface subsystem 112 may communicate through various technologies, such as application programming interfaces (APIs), including SOAP, RESTful techniques, etc.

In some embodiments, the backend interface subsystem 112 may be configured for communication through the transmission and/or receiving of information packets, text files, database records, flat files, Microsoft Excel™ files, extended markup language files (XML files), etc.

In some embodiments, the backend interface subsystem 112 may be configured for querying information from one or more external databases. In some embodiments, the backend interface subsystem 112 may be configured for the derivation of information from websites, RSS feeds, etc. Information obtained by the backend interface subsystem 112 may be stored in data storage 150 for future use/analytics.

The rules engine subsystem 114 may be configured for the generation, application, modification, etc., of one of more logical rules that may be utilized by various elements of the system 100. For example, these logical rules may be utilized by the decision support subsystem 110 in ranking, prioritizing and/or collating various options that may be presented to a user. Rules may include, for example, the maximum geographical distance in which a user may obtain bids from dealerships, financing options available to users having various credit scores, rules based on user's preferences (e.g., those stored in a user's profile), etc.

The notification subsystem 116 may be configured to provide notifications to various users, dealers and/or other individuals and/or systems. There may be various scenarios where notifications may be made, such as when the system 100 determines that there is increased demand for a particular type of car, that an inquiry has been made by a user, to request bids, to remind a user that a reserved transaction may need to be consummated before a particular date, confirmation of a reservation, to notify a user that particular types of vehicles may be available, etc. Notifications may be implemented through various communication technologies, such as through notifications on a smart devices (e.g., a smart phone or a tablet), telephony communications (e.g., an automated call), SMS communications, email, etc.

The matching subsystem 118 may be configured to conduct matching of a desired vehicle transaction with information that may be stored in data storage 150 regarding potentially available inventory.

The matching subsystem 118 may be configured to apply various rules in determine whether there is a match, especially where the match may not be identical. For example, one or more rules may be applied to rank/prioritize matches based on correlation, similarities, differences, how current the information is, etc.

The analytics engine subsystem 120 may be configured for the analysis of various elements of information and/or generation of reports. For example, historical information may be stored in data storage 150 and may be accessed for the generation of one or more reports.

In some embodiments, the analytics engine subsystem 120 may be configured to conduct various types of statistical analysis, such as regression analyses, identifying correlations/cross-correlations, etc. The analytics engine subsystem 120 may be configured to provide one or more reports to the administrative interface subsystem 108. In some embodiments, the analytics engine may be configured to provide one or more reports to the user interface subsystem 106. For example, a user may wish to see historical price trends, incentive trends and/or rate trends associated with a particular vehicle.

In some instances, the system 100 and/or devices 102, 103 may provide decision support tools, which may help arrange and/or present the information in such a way as to aid a party in selecting between one or more options such that the option better suits the party's needs or has a favorable cost. There may be further benefits from dynamically providing credit pre-approvals/pre-qualifications in relation to entities that may require financing to purchase a vehicle.

Pre-qualifications may be provided, for example, in certain scenarios where pre-approval may not be desirable, feasible, or practical.

There may be conventional systems that provide users the ability to view various elements of information and/or simply list vehicles for sale. However, the use of conventional systems may still present a challenge for users to be able to make informed decisions as there may be difficulties in cohesively gathering information regarding the various options available to a user when engaging in a transaction, including information such as financing options, incentives, variations in pricing between various dealerships, comparisons between manufacturer/dealership financing and bank financing, etc.

Further, given that there may be many disparate elements of information relevant to a transaction, there may be a further need to display, arrange, collate and/or otherwise transform this information such that a user is effectively supported in the user's decision making process. For example, there may be users who select manufacturer financing options without realizing that perhaps a better alternative was to purchase a vehicle outright to access an offer for purchasing the vehicle outright, and then to obtain bank financing for the purchase price.

Accordingly, these difficulties have led to some users making sub-optimal decisions based on incomplete, confusingly arranged and/or inaccurate information. Dealerships and salespeople may take advantage of the information asymmetry in promoting less than optimal deals and offers.

Further, there may be various additional costs that may be incurred as a user conducts research, such as opportunity cost for the time spent obtaining information, financial costs where users purchase additional research information, transportation costs (e.g., where dealerships are geographically dispersed and a user may need to travel to various dealerships to engage in negotiations), etc.

Some users may also find negotiating and/or information gathering confusing, overwhelming and/or tiring, as information may not be readily available and/or consistent. Consumers often are not aware of all of the different options available, and this information is not readily accessible, for example, from dealerships.

There may be a deficit in financial literacy with consumers, and as some of the required information may not be readily accessible, the information may require a significant amount of time to review, or generally it needs to be researched by consumers which is time consuming and information may be out of date.

In some embodiments, a platform/system/network 10 may be configured for facilitating transactions involving one or more vehicles over a communication network. The platform may be utilized by one or more users (e.g., buyers or sellers) to obtain decision support related to the various options available to the user, such as incentive programs, financing options, prices between dealerships, trade-in offers, etc.

The platform may also be configured to facilitate bidding by various entities in view of an inquiry by one or more users (e.g., dealerships may respond to inquiries with quotes that in some embodiments, may be irrevocable for a time if a deposit is provided). These bids may be provided in the form of price quotes, may be time-limited, etc.

The platform may also be configured to interoperate and/or communicate with various external entities, which may be associated with one or more computing systems and/or databases, such as credit rating bureaus, financial institutions (e.g., lending facilities, banks, credit unions), transaction payment systems, incentive databases, etc.

The platform may be configured to facilitate various types of transactions, including: new vehicle purchases; used vehicle purchases; and/or private vehicle sales.

The platform may bring together various market participants, such as financial institutions, dealerships, buyers, sellers, etc., whose information may not be readily accessible/available together in conventional systems. Further, as the platform may be configured to conduct credit pre-approvals/pre-qualifications, financial institutions and dealerships may have increased trust in the creditworthiness of purchasers.

The platform may include the generation, application and/or adaptation of a number of rules that, in part, can be configured to enable a series of options to be generated, and presented, that may be advantageous financially or that reflect strong financial literacy.

As the calculation of some of these options can be complicated, for example, from the perspective of numeracy, the platform may advantageously provide for the automatic or semi-automatic calculating of options and/or the determining of which ones should be preferred (e.g., the determination of a total cost of ownership, the determination of an estimated monthly installment, the estimation of the total time to pay off, amortized value, the effect of depreciation, residual values).

In particular, the relationships between offer and incentives for different vehicles on financing options can be complicated and time sensitive, and further, may be geography dependent. The determination and ranking of options is a non-trivial exercise, as there are many parameters that all change over time, and updating the information is time consuming.

One aspect of the platform is that it is designed so that different stakeholders have incentives to participate and in exchange keep information up to date. There may be additional incentives as the platform may provide other information, such as indicating that a user has been credit-verified, or that the user has a strong credit record, that may reduce default and/or other credit risks associated with the lending of money.

For example, dealerships may be interested in using the platform to achieve sales with a reduced/eliminated need of provisioning a showroom and there may also be reduced risk in dealing with credit-verified customers.

The platform may be configured to streamline the process of research and decision making, aiding consumers who may have a lack of time, information and/or financial literacy.

The platform may be further be able to access various financial products that may not be readily available to a user using conventional systems, such as various expanded financing options (e.g., not only manufacturing financing, but also bank financing), products related to existing products held at financial institutions, etc.

In some embodiments, the platform may be designed to integrate with one or more financial institutions, and there may be various pre-qualifications that may motivate the dealerships to offer a better price than otherwise available. Also, the dealerships may be tied to the platform in a way that they are obligated to honour their bids.

The platform may be able to access other financial products that the consumer may have already accessed, and so the relationships between these and possible financing options can be mapped automatically.

There may be further cross-promotional advantages associated with using the platform, such as the ability to cross-sell linked products, the ability to cross-promote, the ability to conduct cross-platform marketing analyses, the ability to more seamlessly integrate services (e.g., due to pre-qualifications, information already captured saved on/accessible from various databases).

The platform may be able to obtain and/or present one or more reviews associated with one or more transactions, for example, buyers and sellers may be able to provide reviews for one another. The aggregate reviews, including any ratings, may be used when presenting information and/or options to a prospective buyer or seller.

Figure 2:
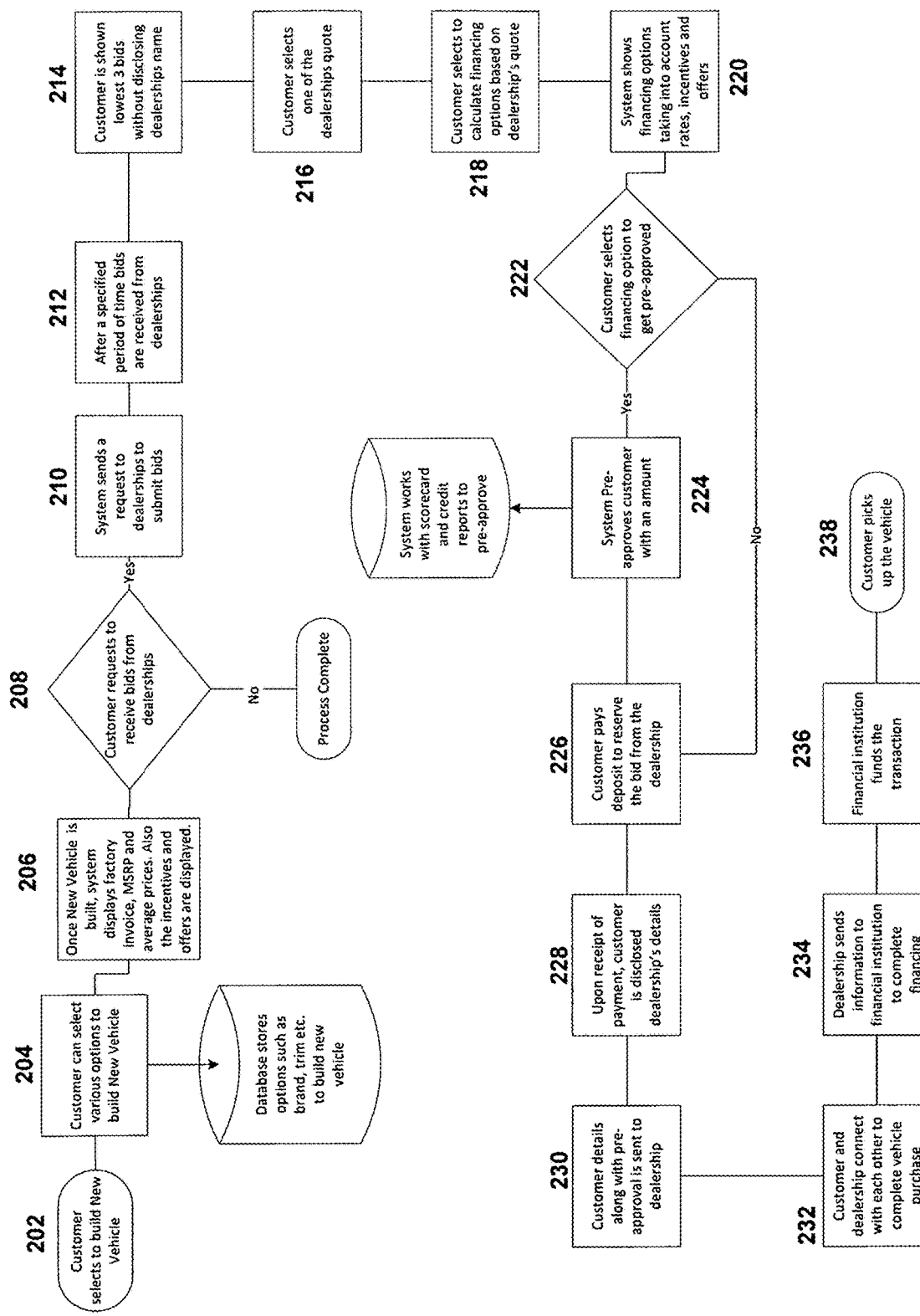
FIG. 2 is a workflow diagram illustrating aspects of an example process workflow to purchase a new vehicle, according to some embodiments.

FIG. 2 is a workflow diagram illustrating some steps of an example process workflow to purchase a vehicle, according to some embodiments.

At 202, a customer (the customer being a user) may seek to purchase a new vehicle through an interface provided by the user interface subsystem 106. The user may, for example, access a website associated with the system 100 or an application on the user's smart phone. There may be a landing page where the user may select that the user seeks to purchase a vehicle.

At 204, the customer may select various options to configure/"build" a new vehicle, such as trim, color, tire package, make, model, year, transmission, etc. The data storage 150 may be configured to store the customer's selection information.

At 206, the system 100 may present various elements of information to the customer, such as the factory invoice price, the manufacturer's suggested retail price, average price, incentives available, offers, etc. Some incentives may be conditional based on financing choices and/or outright purchases. For example, there may be incentives for an outright purchase, or an incentivized lower rate/payment plan being offered by a manufacturer or a financial institution. There may also be various government subsidies being offered, etc.

At 208, the customer may utilize the interface to request to receive bids from various dealerships. These requests may be communicated in various ways, such as through an email, a notification on an application, a website form, an XML file, a SMS communication, etc. A dealership may respond to the requests in various ways as well. For example, in some embodiments, the dealership may utilize the user interface subsystem 106 to transmit one or more bids. The bids may vary between dealerships; for example, a particular dealer may have a large number of a particular car and may be seeking to reduce inventory load, etc.

At 210, the decision support subsystem 110 may request dealership bids through the backend interface subsystem 112, which may obtain such bids from data storage 150 and/or requests bids directly from dealerships through the network. Rules may be applied from the rules engine subsystem 114 in determining which dealerships to request bids from. For example, bids may be requested from 15 dealerships located within 100 kilometers from the customer. In some embodiments, the customer's location is requested by the user interface subsystem 106. In some embodiments, the customer's location may be provided by the device the customer is using to access the user interface subsystem 106 (e.g., through a GPS locator, Wi-Fi connection, IP address, etc.).

The system 100 may be configured to wait for a period of time wherein the various dealerships may have had sufficient time to transmit bids (e.g., 15 minutes). In some embodiments, one or more bids may be preloaded into data storage 150 by the dealerships. In some embodiments, the dealerships may provide bids associated with one or more rules that may be automatically bid (e.g., if the Honda Accord™ 2014 vehicle has been available past November 30, reduce the price by 1% each week until December $31^{st}$).

After this period of time, bids may be received from the dealerships at 212.

At 214, the decision support subsystem 110 may then prioritize and/or rank the bids, and present a subset of the bids to the customer. For example, the lowest 3 bids may be presented. In some embodiments, the particulars of the dealership may not be provided to the customer. One or more rules may be applied from the rules engine subsystem 114 to prioritize and/or rank the bids.

In some embodiments, the user interface subsystem 106 may be configured to present various elements of information and/or comparison tools so that a customer may more readily compare various options. In some embodiments, the comparison tools may generate one or more metrics for comparison, such as lowest price, lowest rate, lowest total cost of ownership, etc.

At 216, the customer may, through the user interface subsystem 106, select one of the bids.

At 218, the customer, may, through the user interface subsystem 106, select to calculate financing options based on the dealership's bid.

At 220, the backend interface subsystem 112 may obtain one or more financing options, which may include rates, principal amounts, interest rates, loan terms, loan options, etc. These financing options may be combined with various incentives and offers. The financing options may be derived from various sources, such as manufacturer financing, bank financing, other financial institution financing, etc.

At 222, the customer may, through the user interface subsystem 106, select a financing option. The decision support subsystem 110 may be configured to present various elements of information to aid the customer in selecting a financing option. For example, the decision support subsystem 110 may present the total cost of ownership, amount of total monthly payments, etc.

In some embodiments, a pre-approval/pre-qualification step 224 is triggered. For example, a customer may select to request a pre-approval/pre-qualification. At 224, the pre-approval/pre-qualification requirement is triggered and the backend interface subsystem 112 may request credit information through various sources, such as financial institution systems 180 and/or credit rating bureau systems 182. Information utilized may include, among others, credit score, credit reports, bank account information, etc.

For example, if a customer has an existing relationship with the financial institution, the customer's information held at the financial institution may be utilized in determining that the customer may be pre-approved/pre-qualified.

In some embodiments, the rules engine subsystem 114 may apply one or more rules that may be used to determine whether a customer should be pre-approved/pre-qualified or not. For example, there may be a threshold credit score, a threshold average bank account amount, etc.

If a customer is not pre-qualified, the system 100 may be configured to refer the customer to a third party lender through, for example, an alternate vehicle financing systems (AVFS) program to evaluate the possibility of financing. These options may be considered and/or presented by the decision support subsystem 110 as potential options available to the customer.

If a customer is still not able to obtain approval, the decision support subsystem 110 and the user interface subsystem 106 may be configured to indicate to the customer that the customer was not able to obtain approval and request the customer to arrange financing at dealership or elsewhere, such as sub-prime lenders. In some embodiments, the system 100 may be configured to interoperate with external systems associated with other lenders, such as sub-prime or alternative lenders.

At 226, the customer may pay a deposit to reserve the bid from the dealership. The user interface subsystem 106 may receive payment information and pass the payment information, through the backend interface subsystem 112, to payment transaction systems 184.

In some embodiments, the customer may be able to pay directly the cost of purchasing the vehicle outright.

At 228, information identifying the dealership may be disclosed to the customer upon receipt of the payment (e.g., address, contact person, contact number, directions). The user interface subsystem 106 may be configured to provide this information through a GUI, such as a message box, a website screen or an application screen.

In some embodiments, the notification subsystem 116 may be configured to provide information by way of a text message, automated call, etc.

The information may indicate time-sensitivity, for example, the dealership may be reserving the vehicle for 72 hours.

At 230, information regarding the customer, such as name, address, e.g., along with pre-approval/pre-qualification information may be communicated to the dealership through the user interface subsystem 106 or the notification subsystem 116. In some embodiments, pre-approval/pre-qualification is only indicated through the transmission of a Boolean flag (e.g., credit scores and reports are not provided).

At 232, the customer and dealership may connect with one another to complete the vehicle purchase. For example, the customer may travel to the dealership and complete the transaction. In some embodiments, the dealership may take the vehicle to an address of the customer's choosing and complete the transaction then instead.

At 234, if the vehicle is being purchased with financing, the dealership may send information to various entities to complete the transaction financing. The information may include, for example, paperwork, vehicle information (e.g., VIN number, make, type, trim, color), and/or any other information required for financing the transaction (e.g., interest rate, term, financing conditions, collateral requirements).

Information regarding the transaction may be saved in data storage 150, and may be accessed by the analytics engine subsystem 120 for conducting analyses (e.g., updating of the average price paid for the vehicle).

At 236, if financing is required, the financing entity (e.g., financial institution such as a bank) may issue/release the financing required to fund the transaction.

At 238, the customer picks up/receives the vehicle.

In some embodiments, the process flow of FIG. 2 further includes steps related to the trade-in of vehicles that may occur as part of a transaction to purchase a new vehicle.

Figure 3:
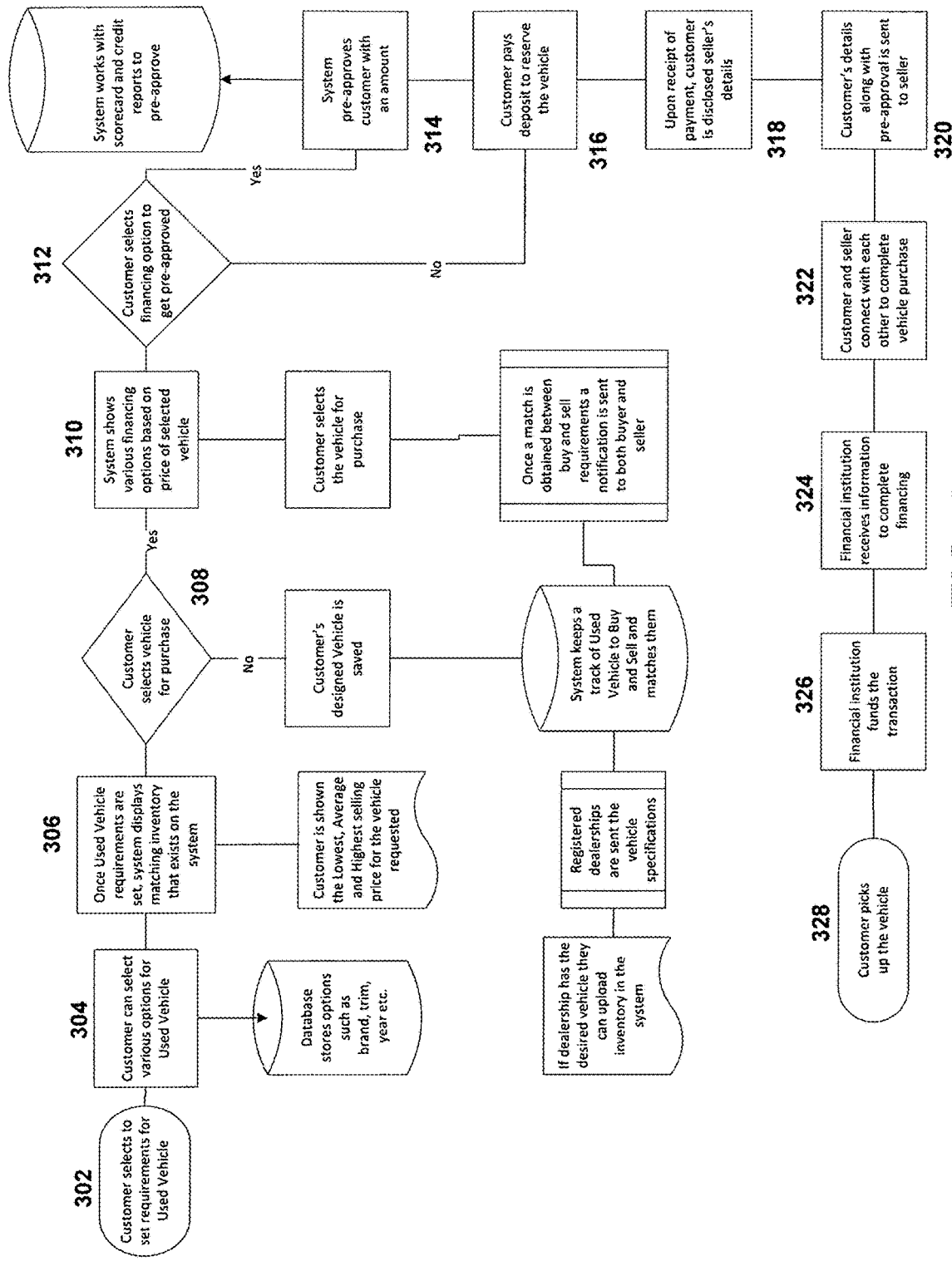
FIG. 3 is a workflow diagram illustrating aspects of an example process workflow to purchase a used vehicle, according to some embodiments.

FIG. 3 is a workflow diagram illustrating some steps of an example process workflow to purchase a used vehicle, according to some embodiments.

The data storage 150 may contain information related to a number of vehicles that may be in inventory at dealerships or are identified as vehicles for sale. For example, a user may have previously indicated that they wish to trade in and/or sell their vehicle, and provided the information into system 100 to be stored in data storage 150.

At 302, the customer, accesses the system 100 through the user interface subsystem 106 to indicate that the customer wishes to purchase/browse for a used vehicle.

At 304, customer may be presented various options through the user interface subsystem 106, for viewing used vehicles. For example, a customer may be able to choose from drop-down menus, different makes, models, year, mileage, condition, brand, trim, price range, size, number of doors, etc. In some embodiments, the user interface subsystem 106 may obtain information from the data storage 150.

In some embodiments, one or more fields may be left blank, as the decision support subsystem 110 may be configured to search across an entire field. For example, a customer may wish to browse across all mid-sized sedans priced between $50,000-$75,000.

At 306, once used vehicle requirements have been entered into the user interface subsystem 106, the user interface subsystem 106 may conduct a search through data storage 150 to identify matching inventory that may exist on data storage 150, presenting various options indicating lowest, average and highest selling price for the vehicle characteristics requested. For example, the user interface subsystem 106 may present various 2006 Honda Civics™ having different selling prices.

At 308, through the user interface subsystem 106, the customer may select a vehicle for purchase. If there are no vehicles available, the customer's request characteristics are saved in data storage 150 and tracked by the system 100. If a match is obtained at a later time, the notification subsystem 116 may be configured to notify the matching buyers and sellers, at which time a customer may be able to select a vehicle for purchase and move on to 310.

In some embodiments, dealerships and/or sellers having information registered on system 100 may be provided specifications of the request, so that the dealerships may be able to indicate their inventory availability for the desired vehicle. For example, a customer may desire to purchase a 1997 Acura Integra™, but none may be available in existing inventory known to data storage 150. In this scenario, various dealerships/sellers may be informed that there has been an inquiry about a 1997 Acura Integra™, but no inventory was found. A dealership may then upload information to the system 100, and the system 100, through the notification subsystem 116, may alert both parties if a match is then found.

At 310, the system 100 may be configured to display various financing options based on price of selected vehicle. For example, the system 100 may obtain a number of financing options by utilizing the backend interface subsystem 112 to request quotes from the financial institution subsystems. In some embodiments, financing options may be generated by applying one or more rules from the rules engine subsystem 114.

For example, a financial institution may provide a set of logical rules that may be used to automatically determine financing rates, such as providing a rate of 1% below prime if the value of the vehicle is below $15,000 and the vehicle will be used as collateral for the loan. Financing options may include interest rate, principal amount, interest amount, loan term, loan conditions, collateral requirements, etc.

In some embodiments, the decision support subsystem 110 may apply one or more rules from the rules engine subsystem 114 in prioritizing and/or ranking financing options.

At 312, the customer may, through the user interface subsystem 106, select a financing option. In some embodiments, a pre-approval/pre-qualification step 314 is triggered. For example, a customer may select to request a pre-approval/pre-qualification.

At 314, the pre-approval/pre-qualification requirement is triggered and the backend interface subsystem 112 may request credit information through various sources, such as financial institution systems 180 and/or credit rating bureau systems 182. Information utilized may include, among others, credit score, credit reports, bank account information, etc.

For example, if a customer has an existing relationship with the financial institution, the customer's information held at the financial institution may be utilized in determining that the customer may be pre-approved/pre-qualified.

In some embodiments, the rules engine subsystem 114 may apply one or more rules that may be used to determine whether a customer should be pre-approved/pre-qualified or not. For example, there may be a threshold credit score, a threshold average bank account amount, etc.

If a customer is not pre-qualified, the system 100 may be configured to refer the customer to a third party lender through, for example, an alternate vehicle financing systems (AVFS) program to evaluate the possibility of financing. These options may be considered and/or presented by the decision support subsystem 110 as potential options available to the customer.

If a customer is still not able to obtain approval, the decision support subsystem 110 and the user interface subsystem 106 may be configured to indicate to the customer that the customer was not able to obtain approval and request the customer to arrange financing at dealership or elsewhere, such as sub-prime lenders. In some embodiments, the system 100 may be configured to interoperate with external systems associated with other lenders, such as sub-prime or alternative lenders.

At 316, the customer may pay a deposit to reserve the vehicle. The user interface subsystem 106 may receive payment information and pass the payment information, through the backend interface subsystem 112, to payment transaction systems 184. In some embodiments, the customer may be able to pay directly the cost of purchasing the vehicle outright.

At 318, information identifying the seller may be disclosed to the customer upon receipt of the payment (e.g., address, contact person, contact number, directions). The user interface subsystem 106 may be configured to provide this information through a GUI, such as a message box, a website screen or an application screen.

In some embodiments, the notification subsystem 116 may be configured to provide information by way of a text message, automated call, etc. The information may indicate time-sensitivity, for example, the dealership may be reserving the vehicle for 72 hours.

At 320, information regarding the customer, such as name, address, e.g., along with pre-approval/pre-qualification information may be communicated to the dealership through the user interface subsystem 106 or the notification subsystem 116. In some embodiments, pre-approval/pre-qualification is only indicated through the transmission of a Boolean flag (e.g., credit scores and reports are not provided).

At 322, the customer and seller may connect with one another to complete the vehicle purchase. For example, the customer may travel to the seller's premises and complete the transaction. In some embodiments, the seller may take the vehicle to an address of the customer's choosing and complete the transaction then instead.

At 324, if the vehicle is being purchased with financing, the buyer/seller may be required to send information to various entities to complete the transaction financing. The information may include, for example, paperwork, vehicle information (e.g., VIN number, make, type, trim, color), and/or any other information required for financing the transaction (e.g., interest rate, term, financing conditions, collateral requirements). Information regarding the transaction may be saved in data storage 150, and may be accessed by the analytics engine subsystem 120 for conducting analyses (e.g., updating of the average price paid for the vehicle).

At 326, if financing is required, the financing entity (e.g., financial institution such as a bank) may issue/release the financing required to fund the transaction.

At 328, the customer picks up/receives the vehicle.

Figure 4:
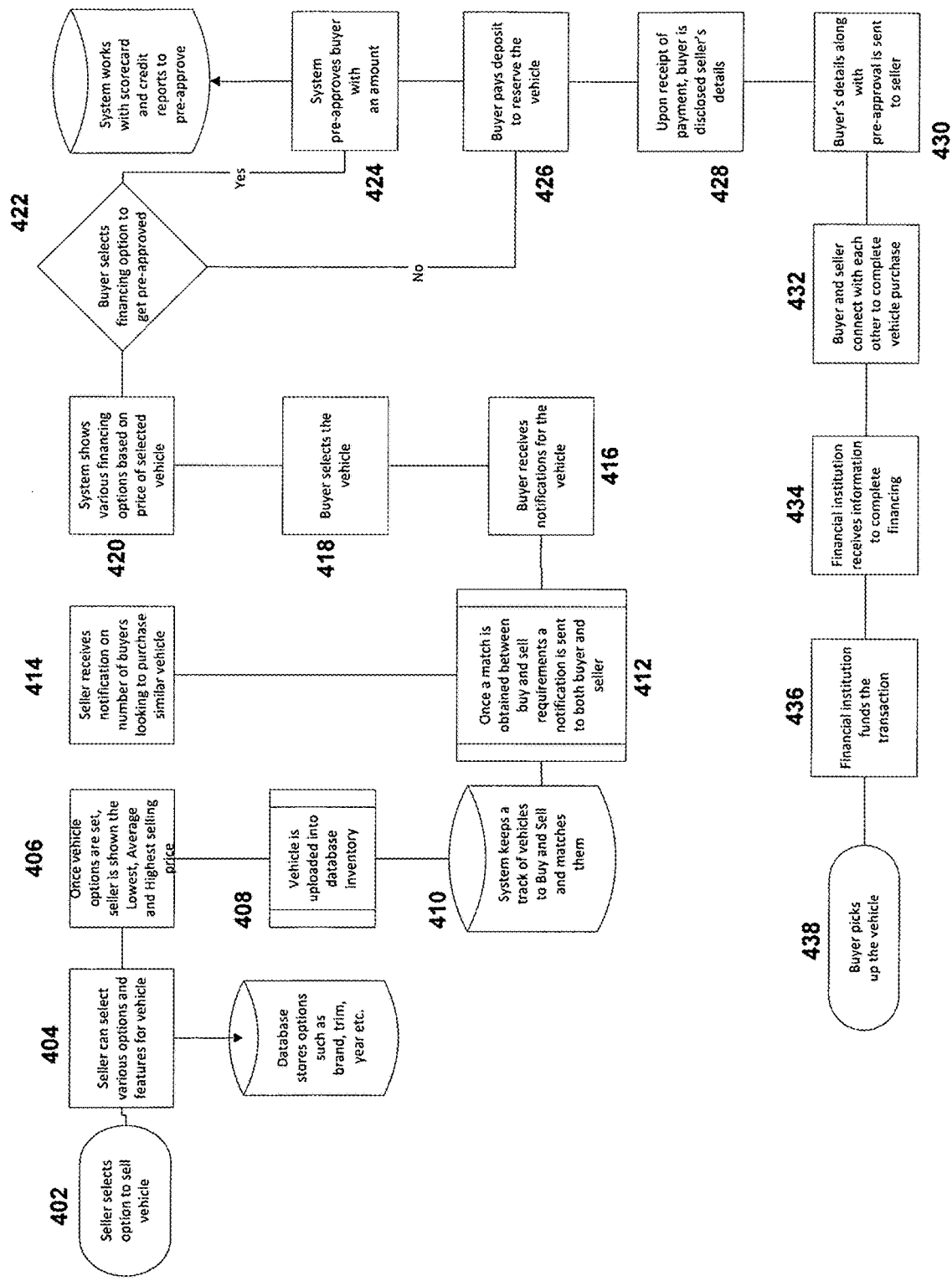
FIG. 4 is a workflow diagram illustrating aspects of an example process workflow to sell a vehicle, according to some embodiments.

FIG. 4 is a workflow diagram illustrating some steps of an example process workflow to sell a vehicle, according to some embodiments.

At 402, the customer may access the system 100 through the user interface subsystem 106 (e.g., an application on his/her smart phone, a website) and indicates that the customer would like to sell a vehicle.

At 404, customer may input various details and/or characteristics about the vehicle to be sold, such as brand, trim, year, make, model, transmission, number of doors, mileage, condition, accident history, maintenance history, etc. The details may be input using the user interface subsystem 106 and stored in data storage 150.

At 406, the user interface subsystem 106 may be configured to display information related to the vehicle to be sold, such as the lowest, average and highest selling price, time to sell, etc. In some embodiments, the user interface subsystem 106 also displays historical information derived from information stored in data storage 150 by the analytics engine. For example, using this application, the vehicles sold faster and for a higher than average price. The highest, lowest and/or average prices may be derived from a number of sources, such as publicly available databases, websites, external proprietary databases, etc.

At 408, the vehicle information may be uploaded into data storage 150.

At 410, the matching subsystem 118 may be utilized to determine whether there are any matches between requested vehicles and the vehicle to be sold. The matching subsystem 118 may be configured to determine identical matches, or matches that may be similar enough that a transaction may occur.

At 412, if there is a match, a notification may be sent to both the prospective buyers and sellers, indicating the strength of the match and providing details of the match. In some embodiments, the information concerning the identities of the buyer and the seller are withheld at this stage.

At 414, a customer may receive notifications describing the number of buyers who are looking to purchase a similar vehicle.

At 416, a buyer may receive a notification that a vehicle matching the buyer's requirements is available on the system 100. In some embodiments, the buyer may be browsing through the steps described in FIG. 3 and may come across the vehicle to be sold in the course of an inquiry.

At 418, the buyer may select the vehicle through the user interface subsystem 106.

At 420, the system 100 may be configured to display various financing options to the buyer based on price of selected vehicle. For example, the system 100 may obtain a number of financing options by utilizing the backend interface subsystem 112 to request quotes from the financial institution subsystems. In some embodiments, financing options may be generated by applying one or more rules from the rules engine subsystem 114. For example, a financial institution may provide a set of logical rules that may be used to automatically determine financing rates, such as providing a rate of 1% below prime if the value of the vehicle is below $15,000 and the vehicle will be used as collateral for the loan. Financing options may include interest rate, principal amount, interest amount, loan term, loan conditions, collateral requirements, etc.

In some embodiments, the decision support subsystem 110 may apply one or more rules from the rules engine subsystem 114 in prioritizing and/or ranking financing options.

At 422, the buyer may, through the user interface subsystem 106, select a financing option. In some embodiments, a pre-approval/pre-qualification step 424 is triggered. For example, a buyer may select to request a pre-approval/pre-qualification.

At 424, the pre-approval requirement is triggered and the backend interface subsystem 112 may request credit information through various sources, such as financial institution systems 180 and/or credit rating bureau systems 182. Information utilized may include, among others, credit score, credit reports, bank account information, etc.

For example, if a buyer has an existing relationship with the financial institution, the buyer's information held at the financial institution may be utilized in determining that the buyer may be pre-approved/pre-qualified.

If a customer is not pre-qualified, the system 100 may be configured to refer the customer to a third party lender through, for example, an alternate vehicle financing systems (AVFS) program to evaluate the possibility of financing. These options may be considered and/or presented by the decision support subsystem 110 as potential options available to the customer.

If a customer is still not able to obtain approval, the decision support subsystem 110 and the user interface subsystem 106 may be configured to indicate to the customer that the customer was not able to obtain approval and request the customer to arrange financing at dealership or elsewhere, such as sub-prime lenders. In some embodiments, the system 100 may be configured to interoperate with external systems associated with other lenders, such as sub-prime or alternative lenders.

In some embodiments, the rules engine subsystem 114 may apply one or more rules that may be used to determine whether a buyer should be pre-approved/pre-qualified or not. For example, there may be a threshold credit score, a threshold average bank account amount, etc.

At 426, the buyer may pay a deposit to reserve the bid from the seller. The user interface subsystem 106 may receive payment information and pass the payment information, through the backend interface subsystem 112, to payment transaction systems 184. In some embodiments, the buyer may be able to pay directly the cost of purchasing the vehicle outright.

At 428, information identifying the seller may be disclosed to the buyer, upon receipt of the payment (e.g., address, contact person, contact number, directions). The user interface subsystem 106 may be configured to provide this information through a GUI, such as a message box, a website screen or an application screen.

In some embodiments, the notification subsystem 116 may be configured to provide information by way of a text message, automated call, etc. The information may indicate time-sensitivity, for example, the dealership may be reserving the vehicle for 72 hours.

At 430, information regarding the buyer, such as name, address, e.g., along with pre-approval/pre-qualification information may be communicated to the seller through the user interface subsystem 106 or the notification subsystem 116. In some embodiments, pre-approval/pre-qualification is only indicated through the transmission of a Boolean flag (e.g., credit scores and reports are not provided).

At 432, the buyer and seller may connect with one another to complete the vehicle purchase. For example, the buyer may travel to the seller's location and complete the transaction. In some embodiments, the seller may take the vehicle to an address of the buyer's choosing and complete the transaction then instead.

At 434, if the vehicle is being purchased with financing, information may need to be transmitted to a financial institution (e.g., any paperwork or legal agreements). Information regarding the transaction may be saved in data storage 150, and may be accessed by the analytics engine subsystem 120 for conducting analyses (e.g., updating of the average price paid for the vehicle).

The information may include, for example, paperwork, vehicle information (e.g., VIN number, make, type, trim, color), and/or any other information required for financing the transaction (e.g., interest rate, term, financing conditions, collateral requirements).

At 436, if financing is required, the financing entity (e.g., financial institution such as a bank) may issue/release the financing required to fund the transaction.

At 438, the buyer picks up/receives the vehicle.

FIGS. 6-17 are several screenshots from a mobile application, depicting various stages of a new vehicle purchase process flow, according to some embodiments.

The application of the system 100 provided in the foregoing paragraphs describe some embodiments. The system 100 may be used for various types of purchases that may extend beyond vehicles, such as any tangible, or intangible asset.

There may be other financing options available with different sets of requirements, such as loans consistent with Islamic banking/Sharia-compliant financing requirements that may prohibit the use of specific interest rates.

In some embodiments, once a buyer and a seller complete a transaction, the system 100 may be configured such that they may be able to provide ratings and reviews for each other. Over a period of time the system 100 may have multiple ratings and reviews for both buyers and sellers and thus this information may also be used as decision criteria when buyer and seller decide to engage with each other in the transaction.

For example, when the bids are received from the sellers, the system 100 may be configured to not display name of the dealer and may be configured to could display the ratings/reviews of the dealers.

Thus, a buyer might decide not to accept the bid of the lowest seller if he/she feels uncomfortable with the ratings/reviews of the dealer. The buyer might instead select a higher priced bid based on a more favorable ratings/reviews of that dealer. Such an embodiment may also help reinforce the incentive for a dealer to honor his/her bids.

Figure 18:
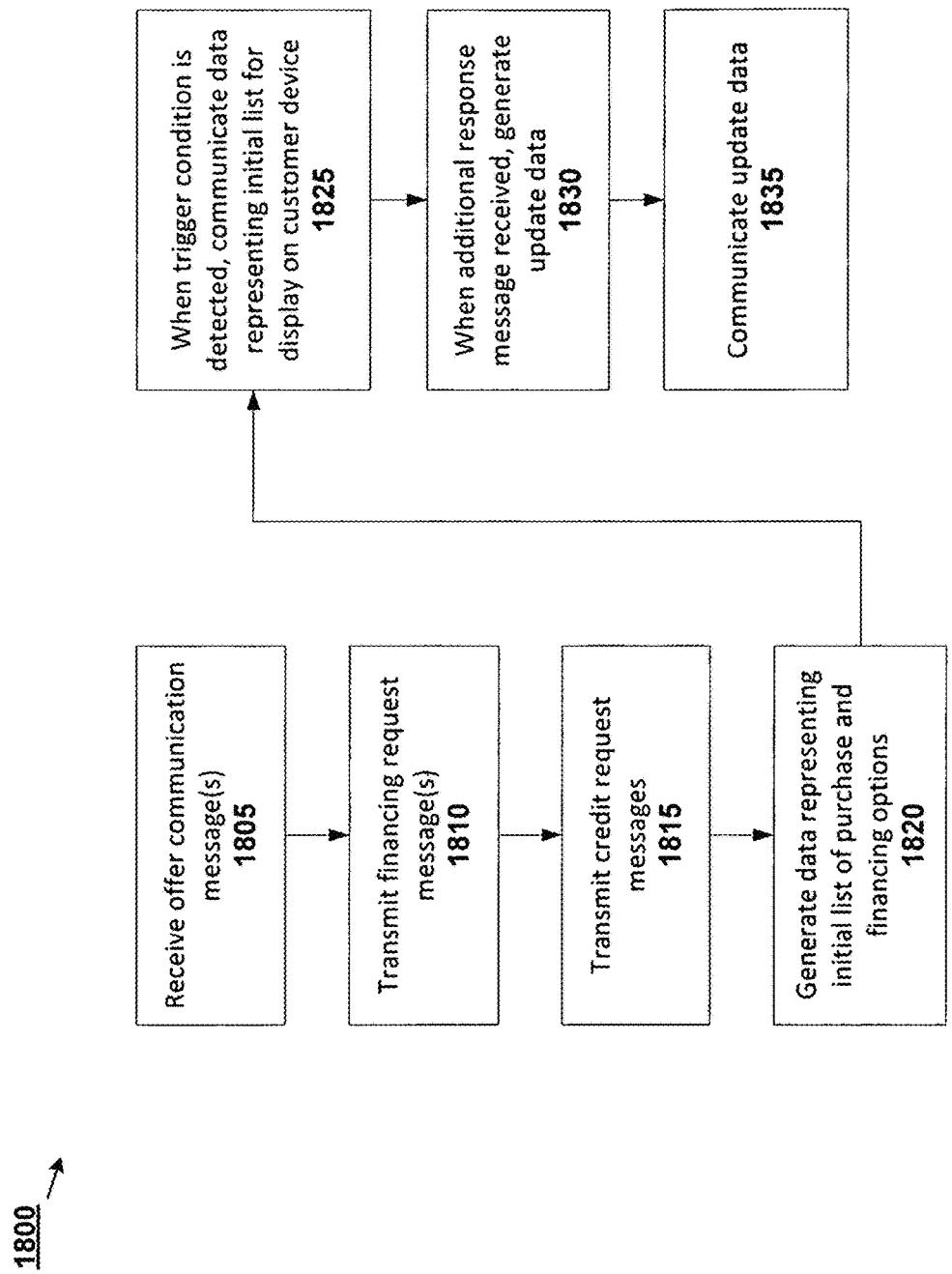
FIGS. 18 and 19 are flowcharts showing aspects of example methods for dynamically presenting vehicular transaction information in a data communication network.

FIG. 18 shows a flowchart illustrating aspects of an example method 1800 for dynamically presenting vehicular transaction information in a data communication network.

At 1805, processors receive, from one or more network systems, one or more offer communication messages. The offer communication messages can include data defining parameters for one or more vehicle offers. For example, the offer communication messages can include data indicating that a subject vehicle has a purchase price of $40,000 with a down payment of $0. The offer communication messages can also include data indicating that an outright purchase has a $400.0 cash incentive, and can include dealer financing rates for various term lengths. For example, the offer communication messages can include the data 2000 illustrated in FIG. 20. This data can be received in any format, order, or arrangement.

In some examples, the offer data can be stored in a data storage device for subsequent retrieval for a current buyer or for other buyers if the offers are more widely available. In some examples, the offers can be averaged/aggregated or statistically analyzed to provide additional/typical offer information to a customer/dealership device.

At 1810, processors transmit one or more financing request messages to one or more network systems. For example, the financing request message can include some of the offer data such as the purchase price (e.g. $40000) and the cash bonus ($4000). In some examples, the processors may send a total purchase prices which may combine prices, cash incentives, taxes, add-ons, freight, etc. In some examples, the financing request message may include a request for amounts higher than the offer data to account for any of these or other additional costs/options.

The processors can transmit financing requests messages to network systems corresponding to any number of different financial institutions.

In some examples, the financing request messages can include buyer identifiers, credentials or data for verifying the buyer's identity and or credit worthiness.

The network system receiving the financing request may be a system associated with a bank or other financial institution or loan provider. In some examples, the system 100 may be associated or part of a financial institution network system. With the financing request messages, the network system can be configured to verify the buyer's identity (e.g. by cross-referencing names, birthdates, etc.) with the network system's own databases or external databases. The financial institution network system can be configured to identify any accounts or assets associated with the buyer's identity at the financial institution. For example, a bank system may determine that the buyer has a savings account, mortgage, line of credit, credit card, and/or investments with the bank.

Based on some or all of the above, the network system can generate one or more financing options. In some examples, these options can include advertised or standard rates for different price points, vehicles, vehicle classes, etc. In some examples, the options can be based on the network system's internal risk rating for the customer.

In some embodiments, the purchase and financing options based on the offer data and the financing data can benefit from dealership cash bonuses or incentives without the customer needing to pay for the vehicle in full. In some examples, the system communications enable a combination of dealership and financial institution benefits. For example, the data representing the non-dealership financing options as illustrated in FIG. 21 and FIG. 22 are based on a lower purchase price of $36,000 versus the dealership financing purchase price of $40,000. Even with a potentially higher interest rate for the Bank Auto Financing option, this may result in lower monthly payment, and/or lower total costs. In some instances, these options would not be available to a customer comparing term sheets at a dealership office.

In some embodiments, the financing data in a response message may include a purchase and financing option based on an existing financing product or account associated with the customer at the financial institution network system from which the response message was received. In some embodiments, the financing data may include an indication of or may only be communicated if the existing financing product or account has available credit to handle the vehicle transaction. In some examples, the financing data may include data which can indicate an increase to an existing monthly payment on the existing financing product/account.

At 1815, the processors transmit one or more credit request messages to one or more network systems. For example, the credit request message can include buyer identifiers, credentials or data for verifying the buyer's identity and or credit worthiness. The network system receiving the credit request may be a system associated with a credit bureau or other financial institution which may have debt/credit information for the buyer. With the credit request messages, the network system can be configured to verify the buyer's identity (e.g. by cross-referencing names, birthdates, etc.) with the network system's own databases or external databases. The credit bureau network system can be configured to identify any accounts, profiles or data associated with the buyer's identity. For example, the network system can identify any credit scores, credit reports, credit request histories, debt payment histories, etc.

At 1820, the processors generate data representing an initial list of purchase and financing options. For example, if only the offer communications have been received, the initial list may include data illustrated in the table of FIG. 20. In other examples, if for example, financing data is received or is otherwise available, the initial list may include the data illustrated in the table of FIG. 21.

At 1825, when a trigger condition is detected as described herein or otherwise, the processors generate signals for communicating the data representing the initial list for display on the customer device. In some instances, this may increase the chance that at least some purchase and financing options are presented at the buyer device even if there are network problems or other technical challenges in obtaining additional information sooner.

At 1830, the processors may receive additional financing, credit or other response messages, and generate update data representing one or more additional or updated purchase and financing options. For example, if the data in FIG. 21 is received in a response message after the first communication trigger condition, the processors may generate update data which only includes new or updated data such as the data represented in the table of FIG. 21. In another example, the processors may generate update data which represents both updated and old purchase and financing options as shown for example in FIG. 22.

In some examples, the processors may generate an initial and/or updated list which only includes the top three or some defined number of ranked options. This ranking may be based on data parameters such as monthly payments, total costs, interest rates, etc., or some combination thereof.

In some examples, the initial and/or updated list may only include options corresponding to buyer defined parameters. For example, if inputs are received identifying parameters defining a buyer-selected financing term, monthly payment, etc., only the options corresponding to these parameters will be included in the list.

In some examples, the processors may receive additional credit response messages and may generate update data by generating a credit risk score for the customer. In some embodiments, before a credit response message is received, a credit risk score for a customer may be based on a default risk parameter associated with a particular vehicle, financing period, interest rate, etc. In some examples, the credit risk score can be adjusted based on received credit data and/or financing data.

In some examples, generating update data may include adjusting an interest rate based on the credit response. For example, if a credit response shows that a customer has a high credit score or has a lower risk of defaulting, the processors may lower the interest rate on one or more of the financing options from the financial institution. In some examples, risk adjustment factors may be included in the offer data. For example, the offer data may specify a prime rate plus X % for credit scores in range A, and a prime rate plus Y % for credit scores in range B, etc.

At 1835, the processors generate signals for communicating the update data representing the additional or updated purchase and financing option for display at the customer device.

The generation and communication of update data can be repeated as additional response messages are received.

Figure 19:
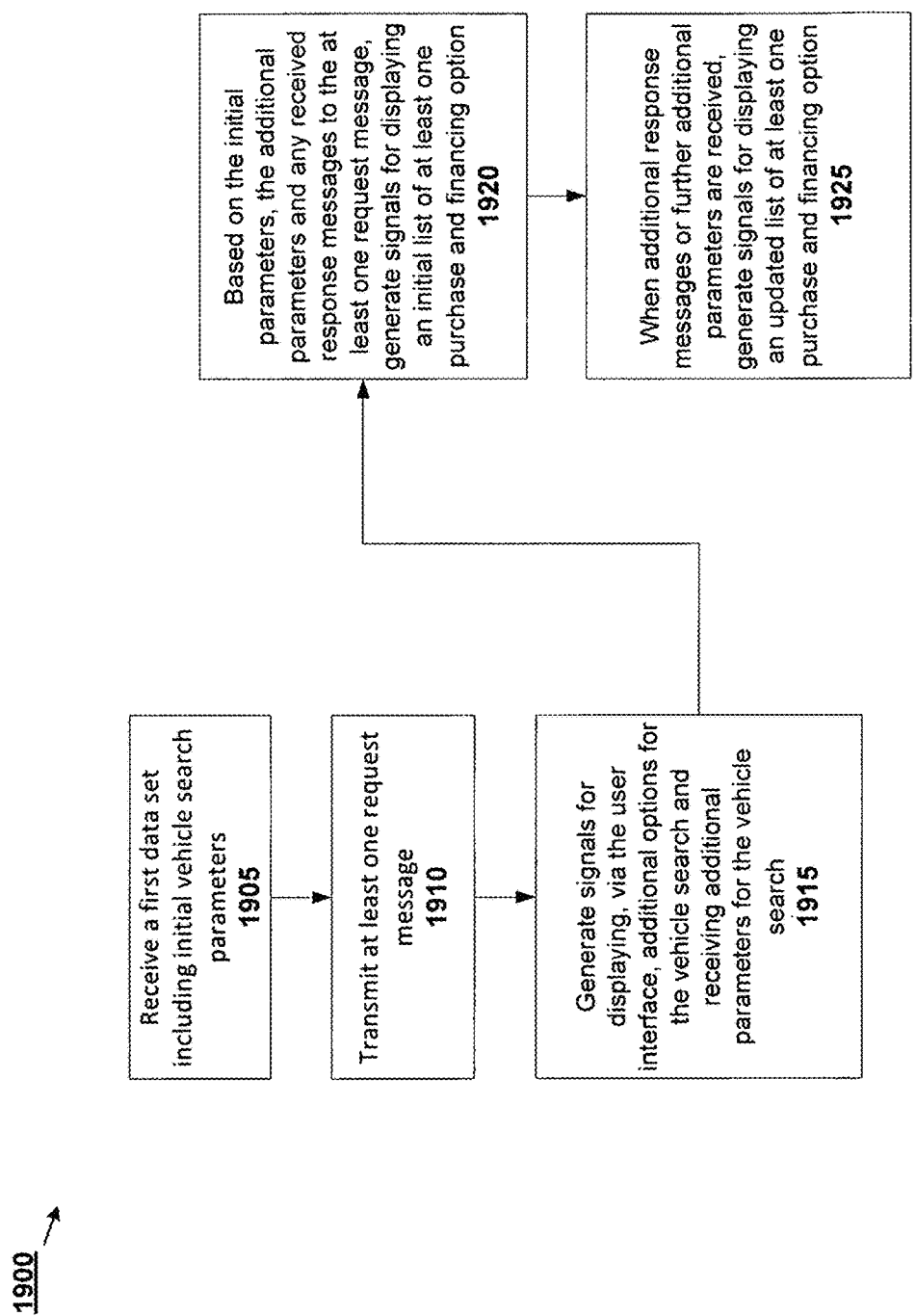

FIG. 19 shows a flowchart illustrating aspects of an example method 1900 for dynamically presenting vehicular transaction information in a data communication network.

At 1905, processors 502 receive, via a user interface (e.g. on a buyer device), a first data set including initial vehicle search parameters. These search parameters can include, for example, a price range, a vehicle class, a vehicle manufacturer, mileage, year of vehicle, etc.

At 1910, the processors transmit a financing and/or credit request message to a remote server 180, 182. The request message can include data based on the initial search parameters. For example, the processors can determine a principle loan amount to include in a financing request based on an explicit price range, or a price range associated with a vehicle class, manufacturer, etc. including in the search parameters.

At 1915, the processors generate signals for displaying additional options for the vehicle search. These can include for example, trims, upgrades, engine types, specific models, etc. The processors can receive additional parameters for the vehicle search via the user interface.

At 1920, the processors can generate an initial list of purchase and financing options, and signals for displaying the initial list at the customer device. In some examples, the purchase and financing options are based on the initial search parameters, the additional parameters and any response messages received from the request messages. For example, a total price may be determined from the initial and additional parameters, and the response messages may indicate an interest rates applicable to a particular price range and/or vehicle make/class/manufacturer/etc. The processor can apply the rates to the total price to determine the purchase and financing options.

In some instances by transmitting request messages based on partial information, the system 100 may be able to obtain financing and/or credit data faster than if the requests were sent only after the final vehicle was selected with all the additional parameters. In some embodiments, this may provide time for network systems to determine and communicate back responses with little or no delay to the displayed purchase and financing options. In some examples, this may provide a seamless and/or smoother user interface experience, and may reduce the frequency with which a user may lose patience and abandon the car purchasing process.

At 1925, when additional response messages or further additional parameters are received, the processors can generate an update list of purchase and financing options and signals for displaying the updated list.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may provide for reduced information asymmetry, improved decision making, streamlined decision making, etc.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Figure 5:
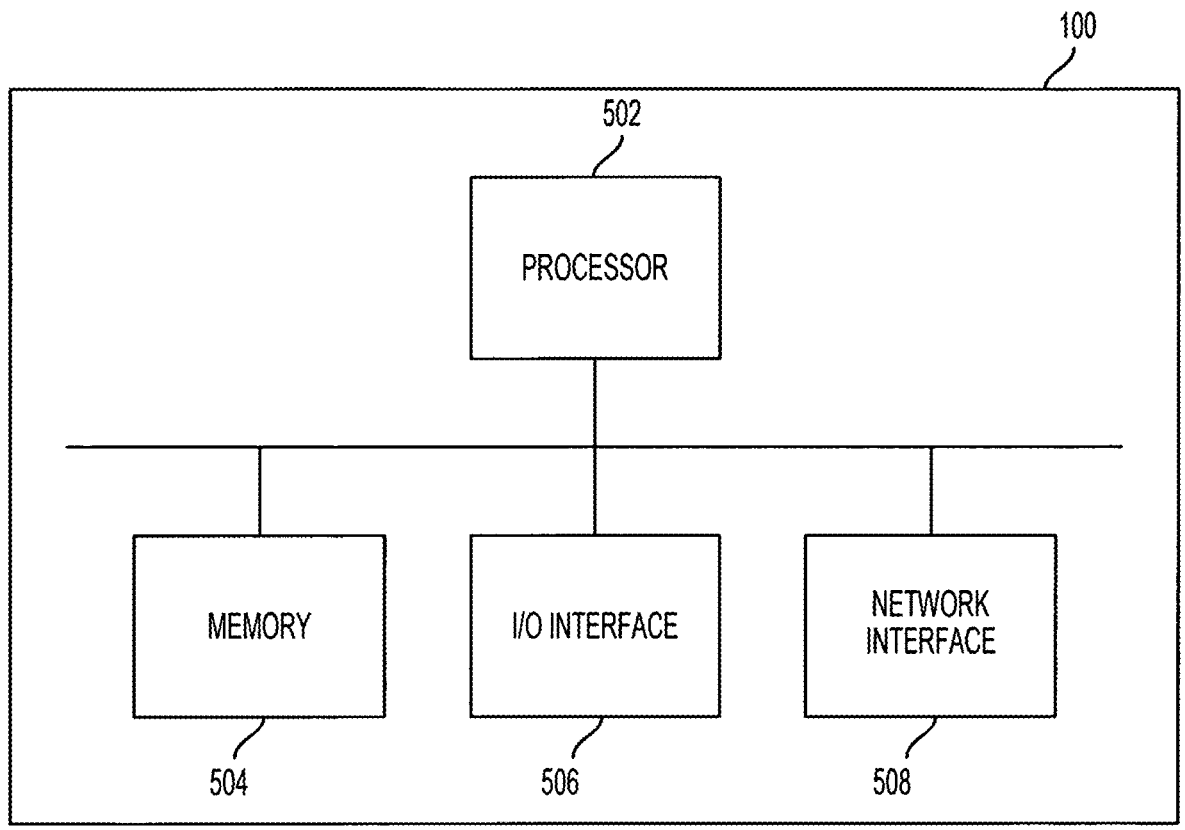
FIG. 5 is a schematic diagram of computing device for implementing a platform for facilitating automotive transactions, exemplary of an embodiment.
Figure 6:
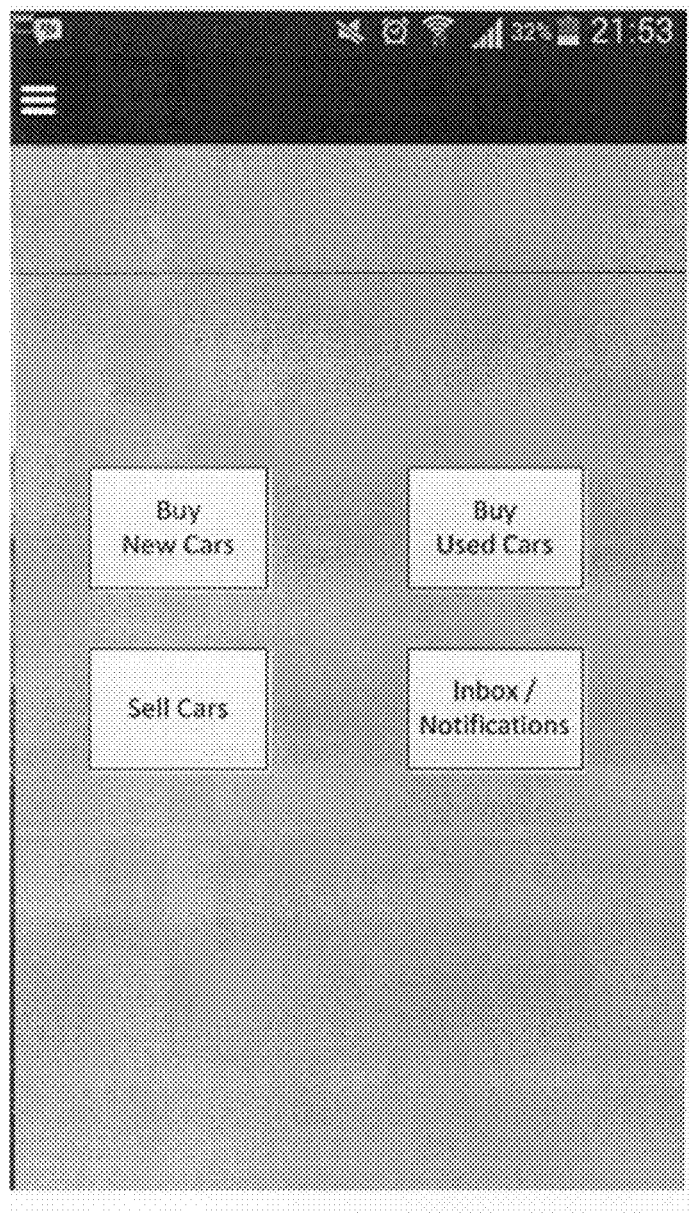
Figure 7:
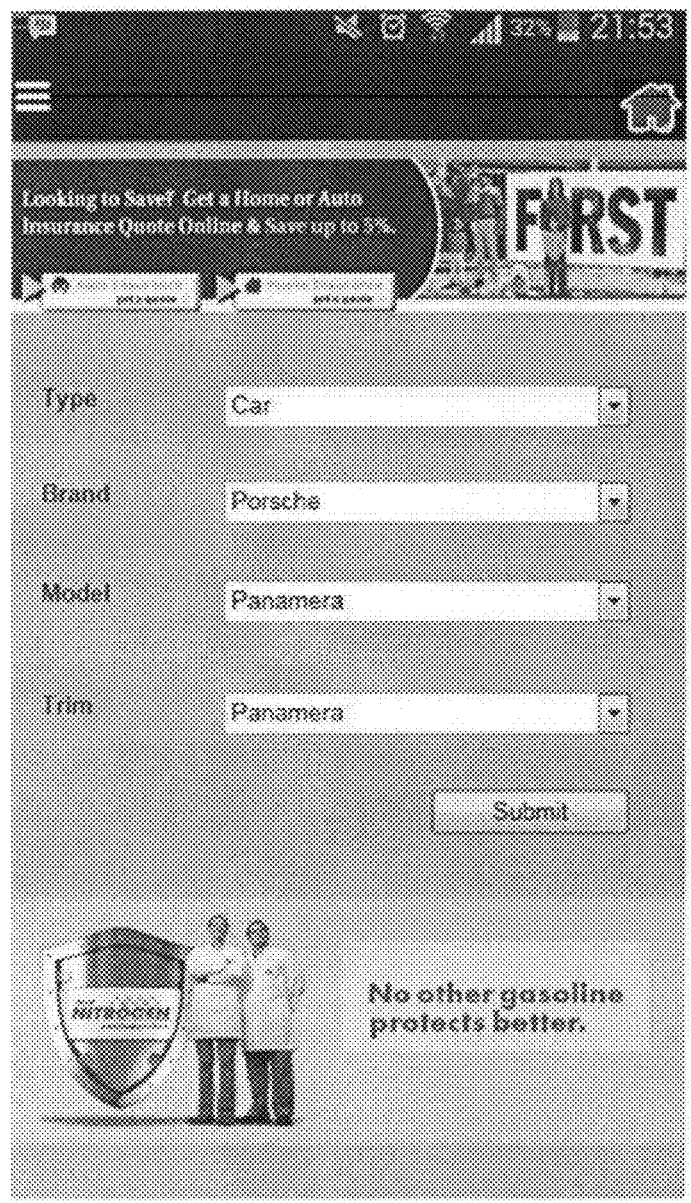
Figure 8:
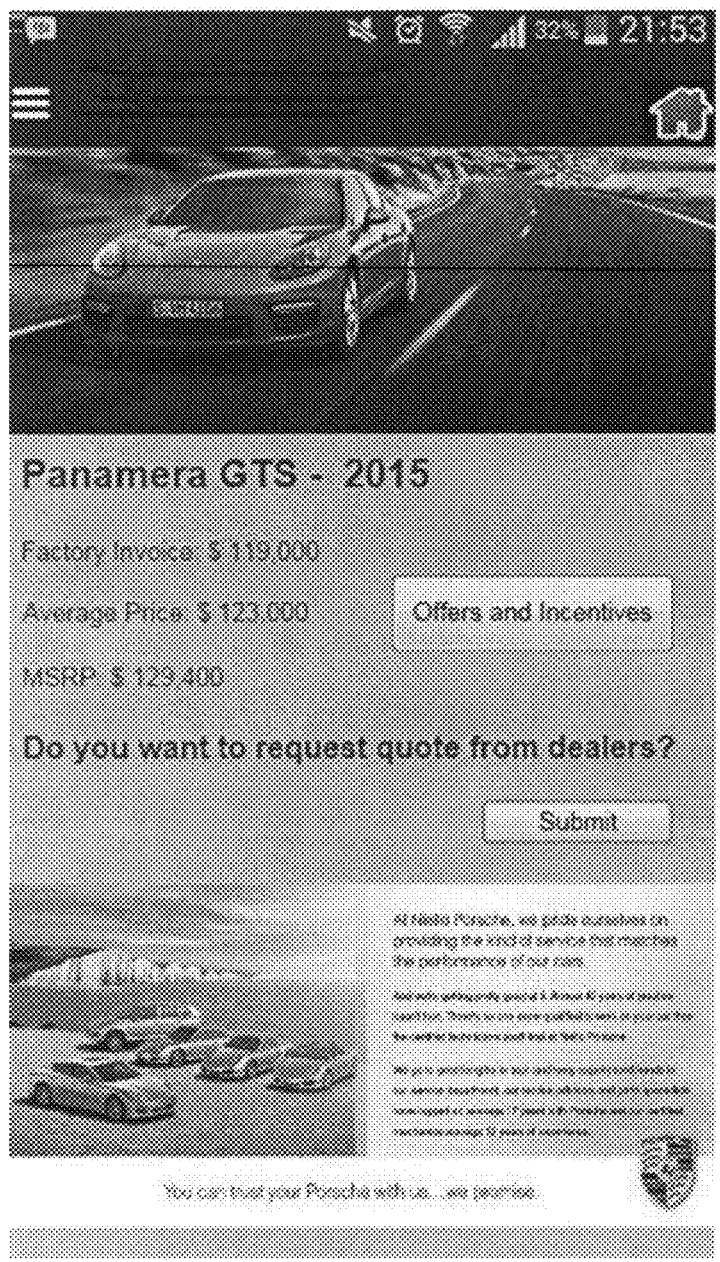
Figure 9:
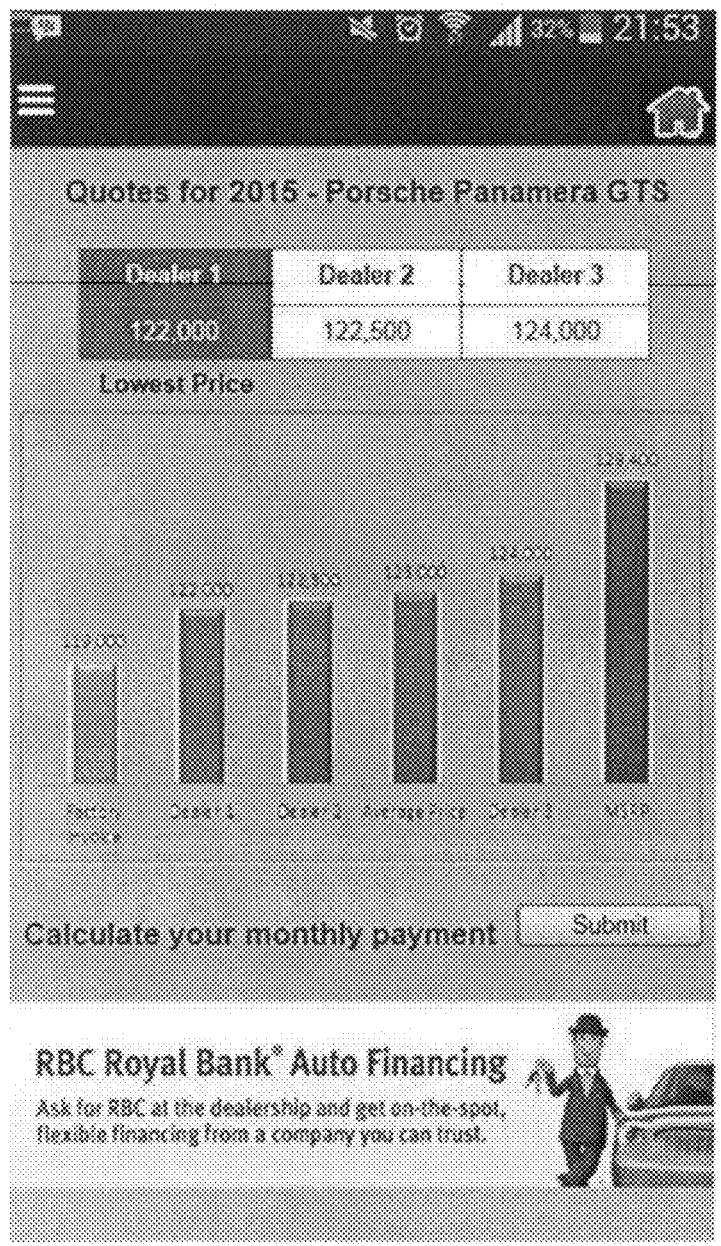
Figure 10:
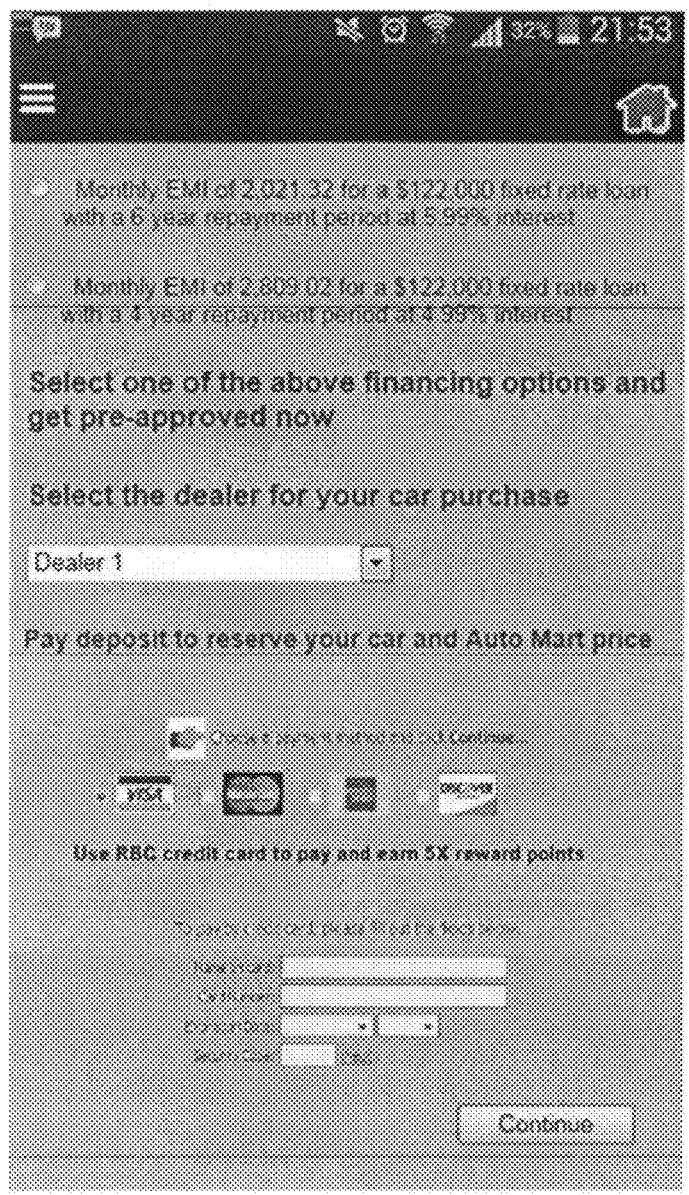
Figure 11:
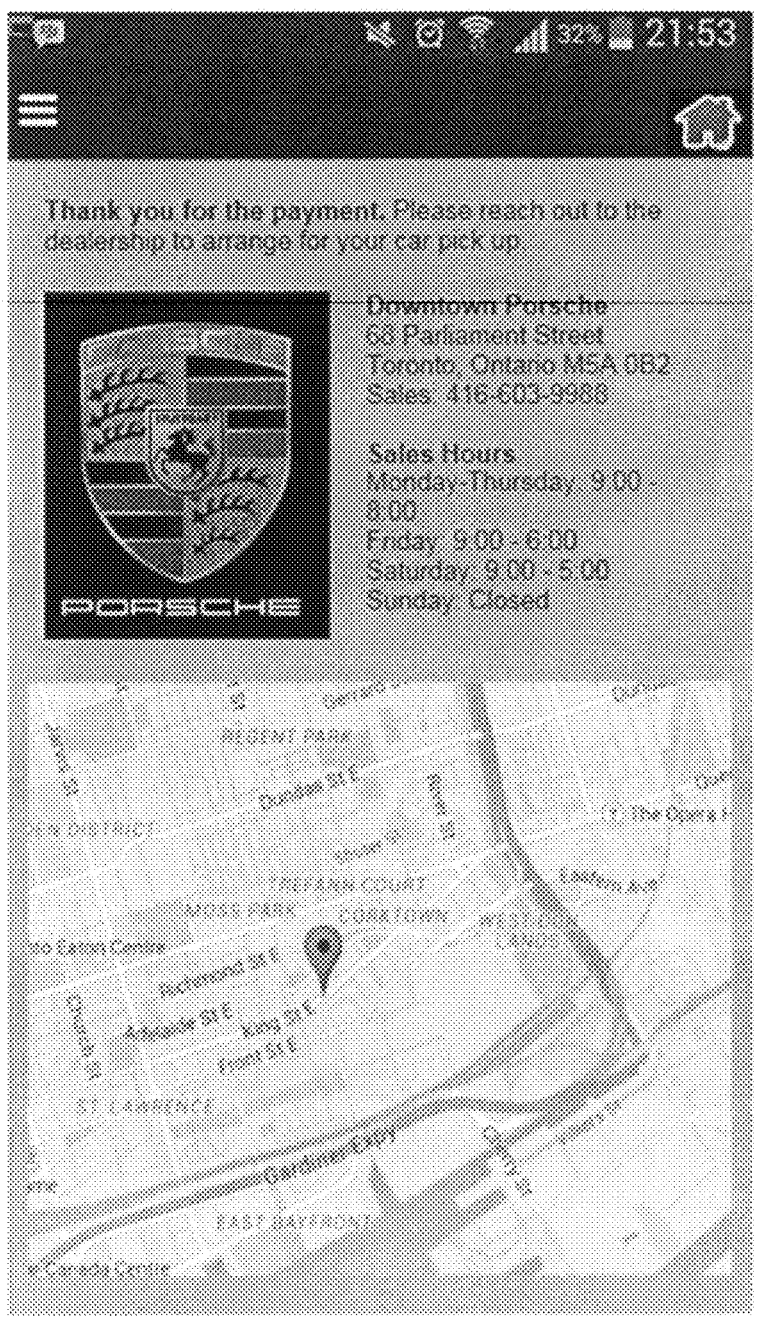
Figure 13:
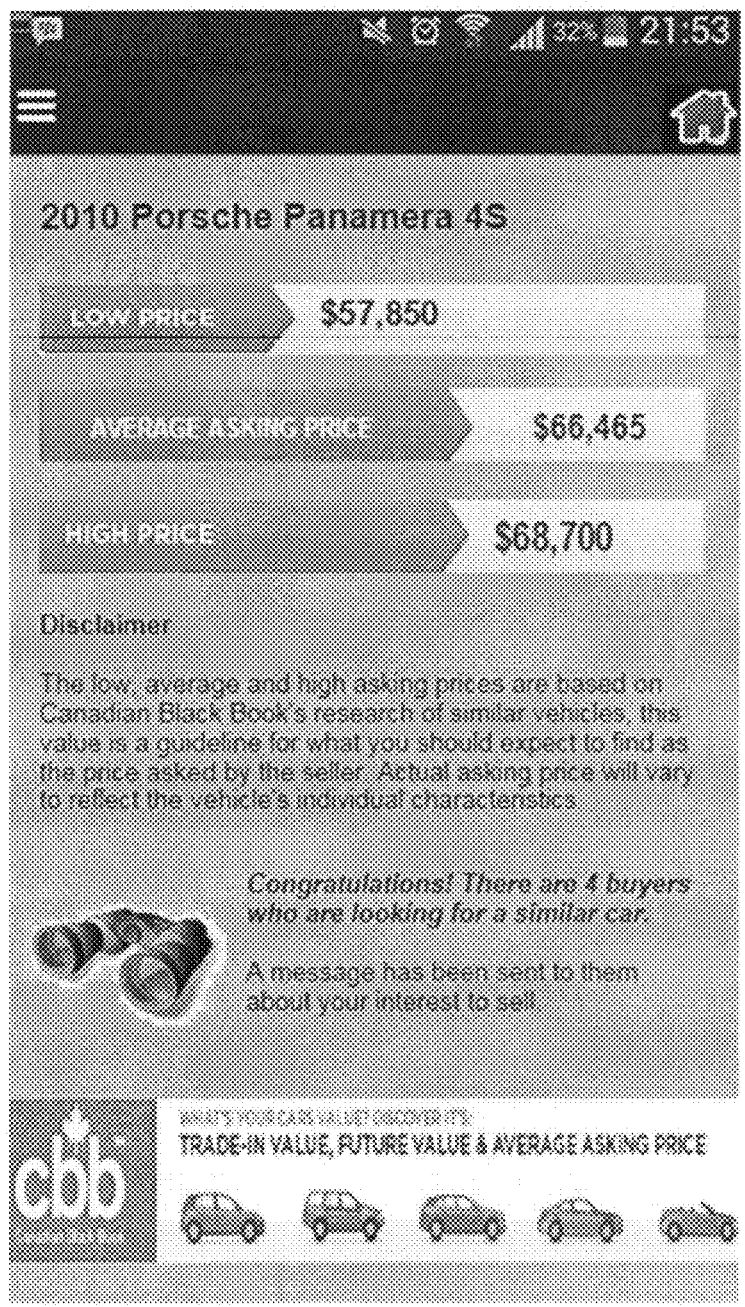
Figure 14:
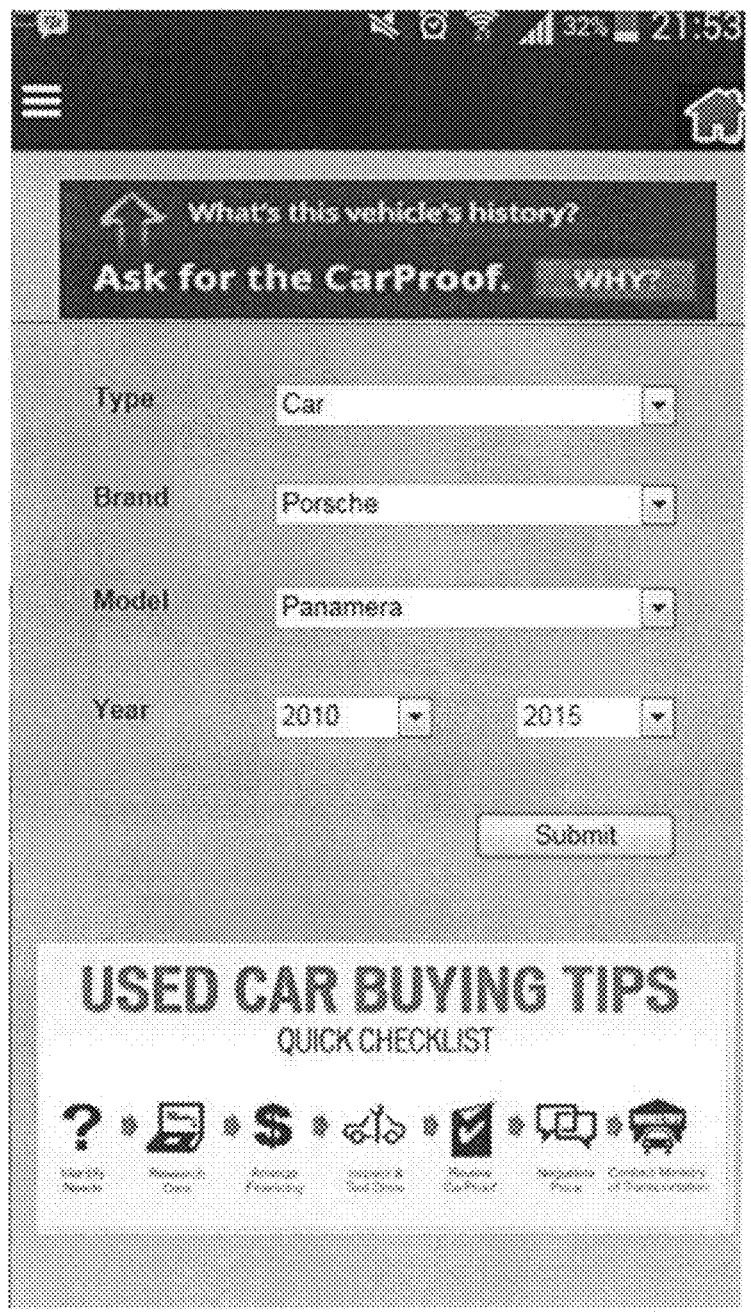
Figure 15:
Figure 16:
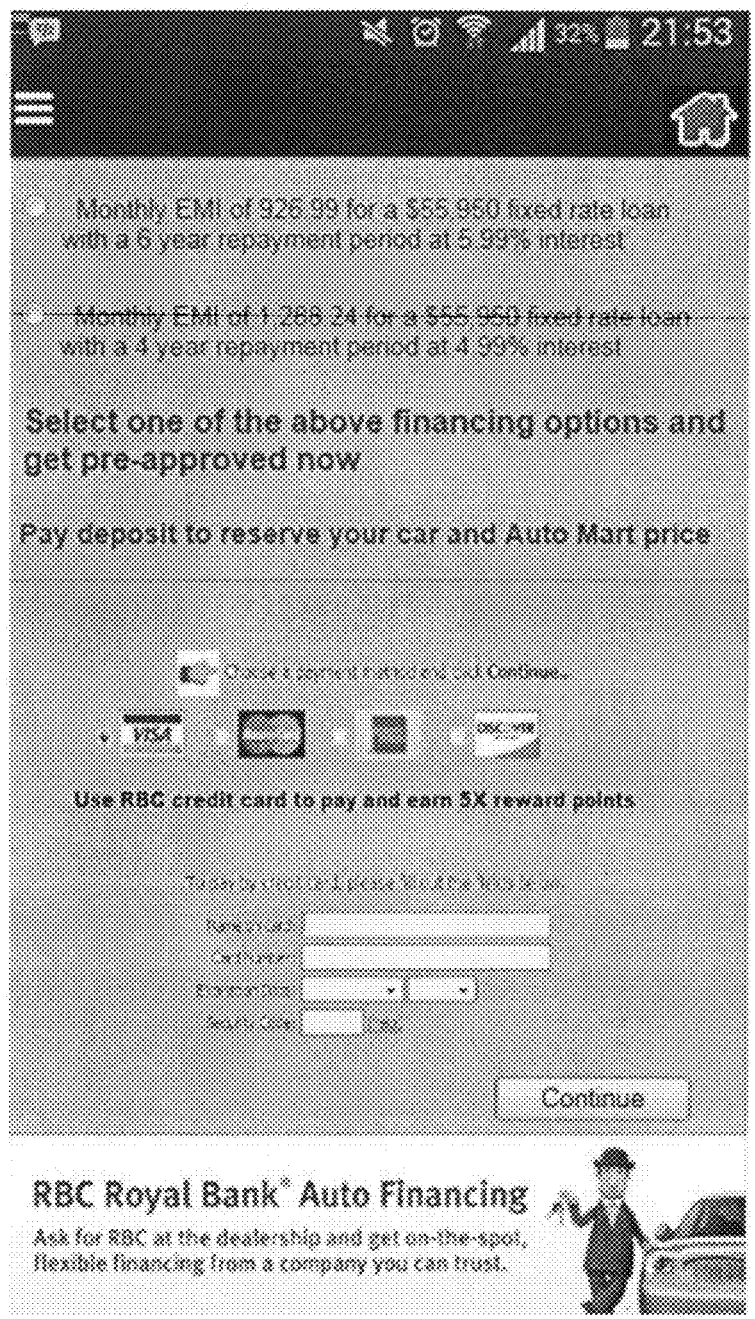
Figure 17:
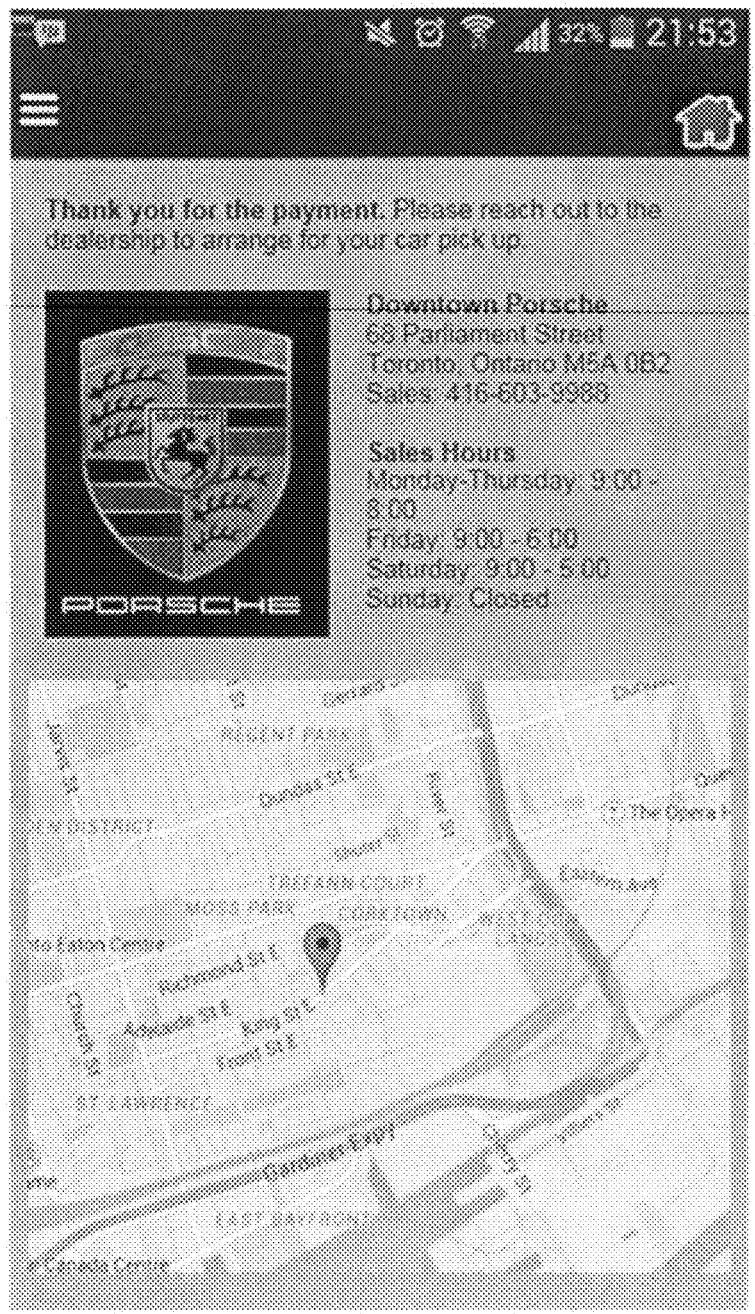

FIG. 5 is a schematic diagram of computing device for implementing one or more aspects of system 100.

As depicted, the computing device implementing system 100 includes at least one processor 502, memory 504, at least one I/O interface 506, and at least one network interface 508.

For simplicity only one computing device is shown but system may include more computing devices operable by users to access remote network resources and exchange data. The computing devices may be the same or different types of devices. The computing device at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Each processor 502 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 504 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 506 enables the computing device to interconnect with one or more input devices, such as a keyboard, mouse, camera, touch screen and a microphone, or with one or more output devices such as a display screen and a speaker.

Each network interface 508 enables the computing device to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The computing device is operable to register and authenticate users (using a login, unique identifier, and password for example) prior to providing access to applications, a local network, network resources, other networks and network security devices. The computing devices may serve one user or multiple users.

With respect to computer-implemented embodiments, the description provided may describe how one would modify a computer or a suitable computing system to implement the system or steps of a method.

The specific problem being solved may be in the context of a computer-related problem, and the system may not be meant to be performed solely through manual means or as a series of manual steps. Computer-related implementation and/or solutions may be advantageous in the context of some embodiments; at least for the reasons of providing scalability (the use of a single platform/system to manage a large number of activities); the ability to quickly and effectively pull together information from disparate networks; improved decision support and/or analytics that would otherwise be unfeasible; the ability to integrate with external systems whose only connection points are computer-implemented interfaces; the ability to achieve cost savings through automation; the ability to dynamically respond and consider updates in various contexts (such as changes in incentives, rates, dealership bids); the ability to apply complex logical rules that would be infeasible through manual means; the ability for buyers and sellers to be truly anonymous until transaction details are agreed upon; among others.

Using electronic and/or computerized means can provide a platform that may be more convenient, scalable, efficient, accurate, and/or reliable than traditional, non-computerized means. Further, many systems for tracking paid time off may be computerized and the platform may advantageously be designed for interoperability, and manual operation may be difficult and/or impossible.

Scalability may be useful as it may be advantageous to provide a system that may be able to effectively manage a large number interconnections and/or integration with external systems.

The convenience and effectiveness of a solution may be valuable in the context of facilitating transactions as individuals may often be scared and/or apprehensive of negotiations. The convenience and ease of use may lead to higher vehicle sales volumes.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. For instance various other systems, methods, architectures, platforms, non-transitory computer-readable media, instruction sets, computer program products may be contemplated. The scope is indicated by the appended claims.

What is claimed is:

1. A decision support computer system for dynamically rendering vehicular transaction information on a graphical user interface through computer signals transmitted across a data communication network, the decision support computer system comprising:
a network interface configured to:
receive, from at least one network system, at least one offer communication message including offer data defining parameters for one or more vehicle offers;
a centralized computer processor configured to:
transmit, across the network interface, at least one financing request message to the at least one network system, the at least one financing request message including at least one of the parameters for the one or more vehicle offers;
transmit, across the network interface, at least one credit request to the at least one network system, the at least one credit request including at least one identifier associated with a customer; and
receive response messages to the at least one financing request and the at least one credit request; and
a dynamic communication subsystem configured to:
based on the offer data parameters and any received response messages, generate an initial data structure storing an initial list including at least one purchase and financing option;
determine that input received on the graphical user interface of a device associated with the customer is for navigating to a view including one or more interactive visual elements representative of the at least one purchase and financing option;
when a first communication trigger condition including the input received on the graphical user interface for navigating to the view including the one or more interactive visual elements is detected, control render, on the graphical user interface of the device associated with the customer, the one or more interactive visual interface elements representative of the initial list including the at least one purchase and financing option;
when additional response messages are received, dynamically generate update data representing at least one additional or updated purchase and financing option; and
generate control signals for controlling a display controller of the device to update the graphical user interface to render the update data representing the at least one additional or updated purchase and financing option through updating the one or more interactive visual interface elements.

2. The system of claim 1, wherein: the first communication trigger condition comprises receipt of signals indicating that the transmission of the at least one financing request or the at least one credit request was not successful.

3. The system of claim 1, wherein the first communication trigger condition comprises a determination that a defined time period has elapsed.

4. The system of claim 1, wherein generating the signals for communicating the update data representing the at least one additional or updated purchase and financing option comprises:
generating signals for communicating the update data for display on an application at the device associated with the customer; and
when signals are received indicating that the update data was not successfully displayed, transmitting a message including the update data to a messaging address associated with the customer.

5. The system of claim 1, wherein the response messages to the at least one financing request include data defining parameters for one or more financing options from a system associated with a third party not involved in the one or more vehicle offers.

6. The system of claim 5, wherein at least one of: generating the data representing the initial list, and generating the update data comprises:
determining financing options for one or more of the vehicle offers, and identifying a defined number of the purchase and financing options based on at least one data parameter.

7. The system of claim 1, wherein when the additional response messages include an offer expiration message indicating that one or more of the offers are no longer available, generating the update data representing the at least one additional or updated purchase and financing option includes removing one or more of the purchase and financing options.

8. The system of claim 1, wherein the response messages to the at least one credit request include data for determining a credit risk score associated with the customer; and wherein generating the update data representing the at least one additional or updated purchase and financing option includes generating update data which changes at least one purchase or financing parameter associated with the at least one additional or updated purchase and financing option.

9. The system of claim 1, wherein when no response messages to the at least one credit request have been received, at least one of: generating the data representing the initial list, and generating the update data comprises:

generating a credit risk score associated with the customer based on a default risk parameter; and
updating the credit risk score when a response message to the at least one credit request is received.

10. The system of claim 1, wherein the response messages to the at least one financing request include data defining parameters for one or more financing options using an existing financing account associated with the customer.

11. A method for dynamically rendering vehicular transaction information across a data communication network, the method comprising:
receiving, at a centralized computer processor from at least one network system across a network interface, at least one offer communication message including offer data defining parameters for one or more vehicle offers;
transmitting, across the network interface, at least one financing request message to the at least one network system, the at least one financing request message including at least one of the parameters for the one or more vehicle offers;
transmitting, across the network interface, at least one credit request to the at least one network system, the at least one credit request including at least one identifier associated with a customer;
based on the offer data parameters and any received response messages to the at least one financing request and the at least one credit request, generating, by the centralized computer processor, an initial data structure storing an initial list including at least one purchase and financing option;
determining that input received on a graphical user interface of a device associated with the customer is for navigating to a view including one or more interactive visual elements representative of the at least one purchase and financing option;
when a first communication trigger condition including the input received on the graphical user interface for navigating to the view including the one or more interactive visual elements is detected, control rendering, on the graphical user interface of the device associated with the customer, the one or more interactive visual elements representative of the initial list including the at least one purchase and financing option;
when additional response messages are received, dynamically generating update data representing at least one additional or updated purchase and financing option; and
generating control signals for controlling a display controller of the device to update the graphical user interface to render the update data representing the at least one additional or updated purchase and financing option through updating the one or more interactive visual interface elements.

12. The method of claim 11, wherein: the first communication trigger condition comprises receipt of signals indicating that the transmission of the at least one financing request or the at least one credit request was not successful.

13. The method of claim 11, wherein the first communication trigger condition comprises a determination that a defined time period has elapsed.

14. The method of claim 11, wherein generating the signals for communicating the update data representing the at least one additional or updated purchase and financing option comprises:

generating signals for communicating the update data for display on an application at the device associated with the customer; and
when signals are received indicating that the update data was not successfully displayed, transmitting a message including the update data to a messaging address associated with the customer.

15. The method of claim 11, wherein the response messages to the at least one financing request include data defining parameters for one or more financing options from a system associated with a third party not involved in the one or more vehicle offers.

16. The method of claim 15, wherein at least one of: generating the data representing the initial list, and generating the update data comprises:
determining financing options for one or more of the vehicle offers, and identifying a defined number of the purchase and financing options based on at least one data parameter.

17. The method of claim 11, wherein when the additional response messages include an offer expiration message indicating that one or more of the offers are no longer available, generating the update data representing the at least one additional or updated purchase and financing option includes removing one or more of the purchase and financing options.

18. The method of claim 11, wherein the response messages to the at least one credit request include data for determining a credit risk score associated with the customer; and wherein generating the update data representing the at least one additional or updated purchase and financing option includes generating update data which changes at least one purchase or financing parameter associated with the at least one additional or updated purchase and financing option.

19. The method of claim 11, wherein when no response messages to the at least one credit request have been received, at least one of: generating the data representing the initial list, and generating the update data comprises:
generating a credit risk score associated with the customer based on a default risk parameter; and
updating the credit risk score when a response message to the at least one credit request is received.

20. The method of claim 11, wherein the response messages to the at least one financing request include data defining parameters for one or more financing options using an existing financing account associated with the customer.

21. A non-transitory, computer-readable medium or media having stored thereon computer-interpretable instructions, which when executed by at least one centralized computer processor, configure the at least one centralized computer processor for:
receiving, at the centralized computer processor from at least one network system, at least one offer communication message including offer data defining parameters for one or more vehicle offers;
transmitting, across a network interface, at least one financing request message to the at least one network system, the at least one financing request message including at least one of the parameters for the one or more vehicle offers;
transmitting, across the network interface, at least one credit request to the at least one network system, the at least one credit request including at least one identifier associated with a customer;
based on the offer data parameters and any received response messages to the at least one financing request and the at least one credit request, generating, by the centralized computer processor, an initial data structure storing an initial list including at least one purchase and financing option;

determining that input received on a graphical user interface of a device associated with the customer is for navigating to a view including one or more interactive elements representative of the at least one purchase and financing option;

when a first communication trigger condition including the input received on the graphical user interface for navigating to the view including the one or more interactive visual elements is detected, control rendering, on the graphical user interface of the device associated with the customer, the one or more interactive visual elements representative of the initial list including the at least one purchase and financing option;

when additional response messages are received, dynamically generate update data representing at least one additional or updated purchase and financing option; and generating control signals for controlling a display controller of the device to update the graphical user interface to render the update data representing the at least one additional or updated purchase and financing option through updating the one or more interactive visual interface elements.

* * * * *